US012748267B2

(12) United States Patent
Tsujino et al.

(10) Patent No.: US 12,748,267 B2
(45) Date of Patent: Sep. 29, 2026

(54) OPTICAL MODULE AND OPTICAL COMMUNICATION DEVICE

(71) Applicant: KYOCERA Corporation, Kyoto (JP)

(72) Inventors: Saki Tsujino, Nara (JP); Tomoyuki Akahoshi, Nara (JP)

(73) Assignee: Kyocera Corporation, Kyoto (JP)

( * ) Notice: Subject to any disclaimer, the term of this patent is extended or adjusted under 35 U.S.C. 154(b) by 283 days.

(21) Appl. No.: 18/718,883

(22) PCT Filed: Dec. 21, 2022

(86) PCT No.: PCT/JP2022/047050

§ 371 (c)(1),
(2) Date: Jun. 12, 2024

(87) PCT Pub. No.: WO2023/120564

PCT Pub. Date: Jun. 29, 2023

(65) Prior Publication Data

US 2025/0052959 A1 Feb. 13, 2025

(30) Foreign Application Priority Data

Dec. 24, 2021 (JP) ................................ 2021-210167

(51) Int. Cl.
*G02B 6/42* (2006.01)

(52) U.S. Cl.
CPC ........... *G02B 6/4202* (2013.01); *G02B 6/428* (2013.01); *G02B 6/4283* (2013.01)

(58) Field of Classification Search
CPC ..... G02B 6/4202; G02B 6/428; G02B 6/4283
See application file for complete search history.

(56) References Cited

U.S. PATENT DOCUMENTS

| | | | | |
|---|---|---|---|---|
| 6,270,263 | B1 * | 8/2001 | Iwase | G02B 6/4255 385/52 |
| 9,151,910 | B2 * | 10/2015 | Yanagisawa | G02B 6/42 |
| 2016/0191166 | A1 * | 6/2016 | Wang | G02B 6/42 398/135 |
| 2021/0141170 | A1 * | 5/2021 | Ueda | G02B 6/425 |
| 2021/0239908 | A1 * | 8/2021 | Ishii | G02B 6/30 |
| 2025/0264666 | A1 * | 8/2025 | Furuta | G02B 6/3608 |

FOREIGN PATENT DOCUMENTS

| | | |
|---|---|---|
| JP | 2003-098392 A | 4/2003 |

* cited by examiner

*Primary Examiner* — Rhonda S Peace
(74) *Attorney, Agent, or Firm* — Volpe Koenig

(57) ABSTRACT

In an optical module, a power supply IC is configured to supply power to a first optical IC and a second optical IC. The first and second optical ICs are configured to perform photoelectric conversion. In the module substrate, a first wiring line connects the power supply IC to the first optical IC, and a second wiring line connects the power supply IC to the second optical IC. The resistance value of the first wiring line is R1, the resistance value of the second wiring line is R2, the shortest path length from the power supply IC to the first optical IC within the first wiring line is L1, and the shortest path length from the power supply IC to the second optical IC within the second wiring line is L2. Here, L2 is longer than L1 and |R2−R1| is smaller than (L2−L1)/L1×R1.

14 Claims, 17 Drawing Sheets

501

OPTICAL MODULE AND OPTICAL COMMUNICATION DEVICE

TECHNICAL FIELD

The present disclosure relates to an optical module that performs at least one of conversion from an optical signal to an electrical signal and conversion from an electrical signal to an optical signal, and an optical communication device that includes the optical module.

BACKGROUND OF INVENTION

A known device is configured to perform conversion between optical signals and electrical signals (for example, below-listed Patent Literature 1). In Patent Literature 1, multiple optical communication devices are mounted on a host circuit substrate. Each optical communication device includes an optical element (referred to as a photoelectric conversion element in the present disclosure) and an IC (Integrated Circuit). The optical element performs photoelectric conversion. The IC is electrically connected to the optical element. In the present disclosure, an electronic component including the photoelectric conversion element and the IC is referred to as an optical IC.

CITATION LIST

Patent Literature

Patent Literature 1: Japanese Unexamined Patent Application Publication No. 2003-98392

SUMMARY

In an embodiment of the present disclosure, an optical module includes a first optical IC, a second optical IC, a first power supply IC, and a module substrate. The first optical IC and the second optical IC are configured to perform photoelectric conversion. The first power supply IC is configured to supply power to the first optical IC and the second optical IC. The first optical IC, the second optical IC, and the first power supply IC are positioned on the module substrate. The module substrate includes a first wiring line and a second wiring line. The first wiring line connects the first power supply IC to the first optical IC. The second wiring line connects the first power supply IC to the second optical IC. A resistance value of the first wiring line is R1, a resistance value of the second wiring line is R2, a length of a shortest path from the first power supply IC to the first optical IC within the first wiring line is L1, and a length of a shortest path from the first power supply IC to the first optical IC within the second wiring line is L2. In this case, L2 is longer than L1 and $|R2-R1|$ is smaller than $(L2-L1)/L1\times R1$.

In an embodiment of the present disclosure, an optical communication device includes the optical module and a motherboard electrically connected to the optical module.

DESCRIPTION OF EMBODIMENTS

Figure 1:
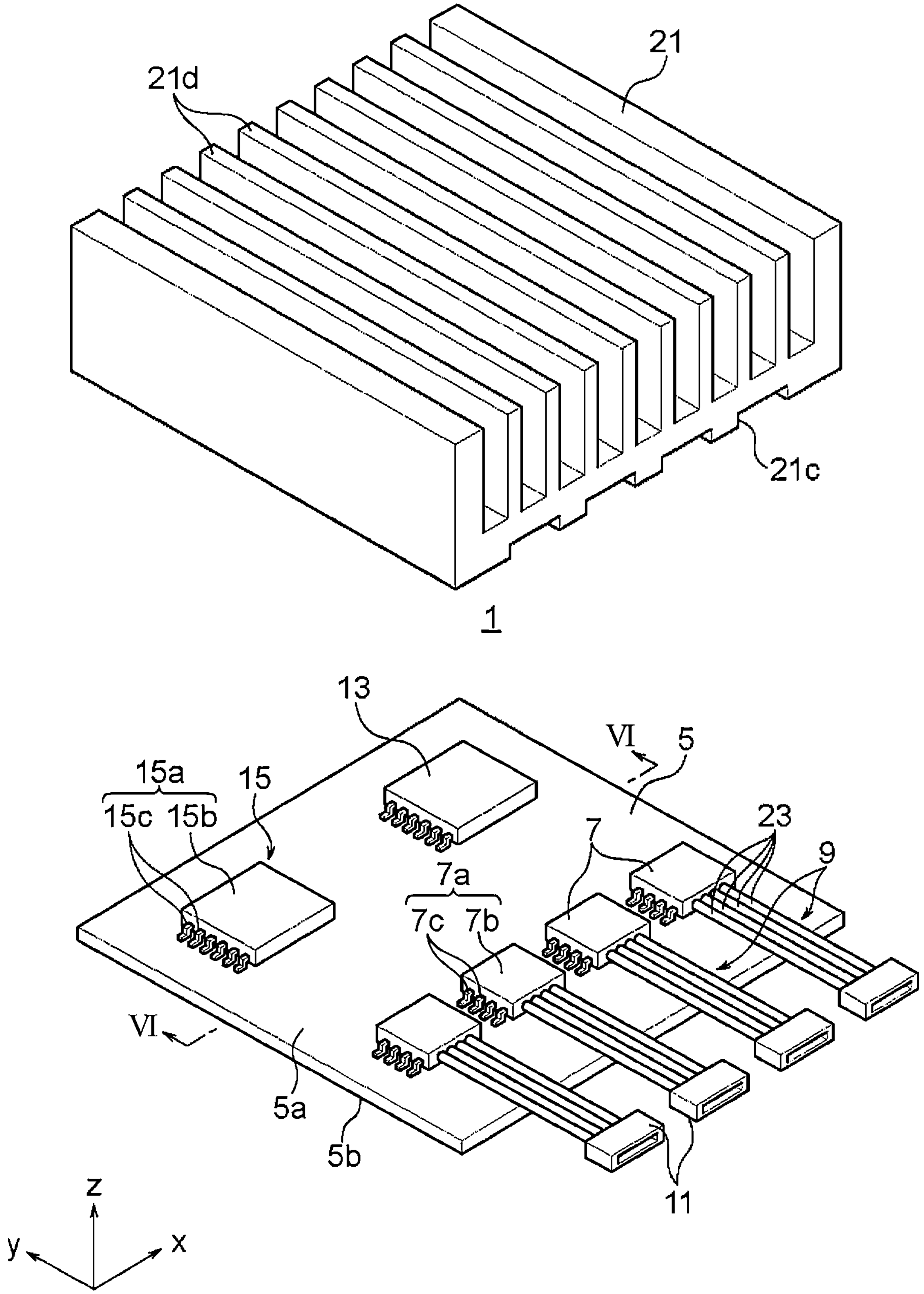
FIG. 1 is a perspective view illustrating an optical module according to a First Embodiment of the present disclosure.

Hereafter, embodiments according to the present disclosure will be described while referring to the drawings. The drawings used in the following description are schematic drawings. Therefore, the dimensional proportions and so on in the drawings do not necessarily match the actual dimensional proportions and so on. The dimensional proportions of identical components in the drawings do not match each other. Illustration of some details may be omitted and some shapes may be illustrated in an exaggerated manner. However, the above statements are not intended to exclude the possibility that the actual dimensional proportions may be as depicted in the drawings, and that features such as shapes and dimensional proportions may be extracted from the drawings.

In the drawings, a Cartesian coordinate system xyz is provided for convenience. The relationship between the Cartesian coordinate system xyz and the vertical direction and so on may be freely chosen. However, for convenience, the +z side may be expressed as up. In addition, a plan view or a planar perspective view means looking in the z direction, unless otherwise stated.

After the description of a First Embodiment, basically, only the differences from the previously described embodiments are described. Matters not specifically mentioned may be assumed to be the same as or similar to the matters previously described, or may be inferred from the previously described matters. For convenience, the same reference symbols may be used for corresponding components in multiple embodiments, even if there are differences between the components.

First Embodiment (Overview of Optical Module)

Figure 2:
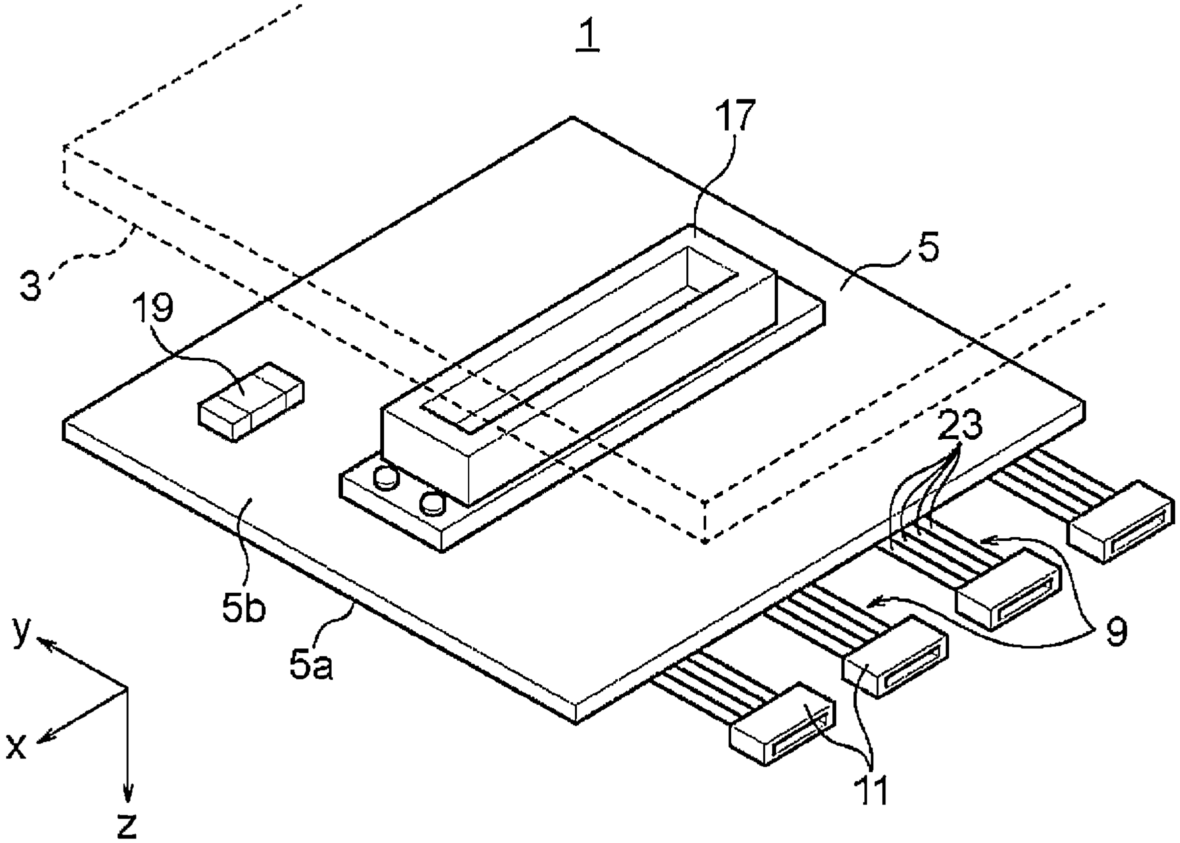
FIG. 2 is a perspective view in which the optical module in FIG. 1 is viewed in a different direction from FIG. 1.

FIG. 1 is a perspective view in which an optical module 1 according to a First Embodiment of the present disclosure is viewed from a +z side. FIG. 2 is a perspective view in which the optical module 1 is viewed from a −z side.

The optical module 1 performs at least one of conversion from an optical signal to an electrical signal and conversion from an electrical signal to an optical signal (hereinafter referred to as "photoelectric conversion"). In order to realize such an operation, the optical module 1 includes, for example, multiple (four in the illustrated example) optical ICs 7, each of which performs photoelectric conversion, a power supply IC 15 that supplies power to the optical ICs 7, and a module substrate 5 on which the optical ICs 7 and the power supply IC 15 are mounted.

Figure 5:
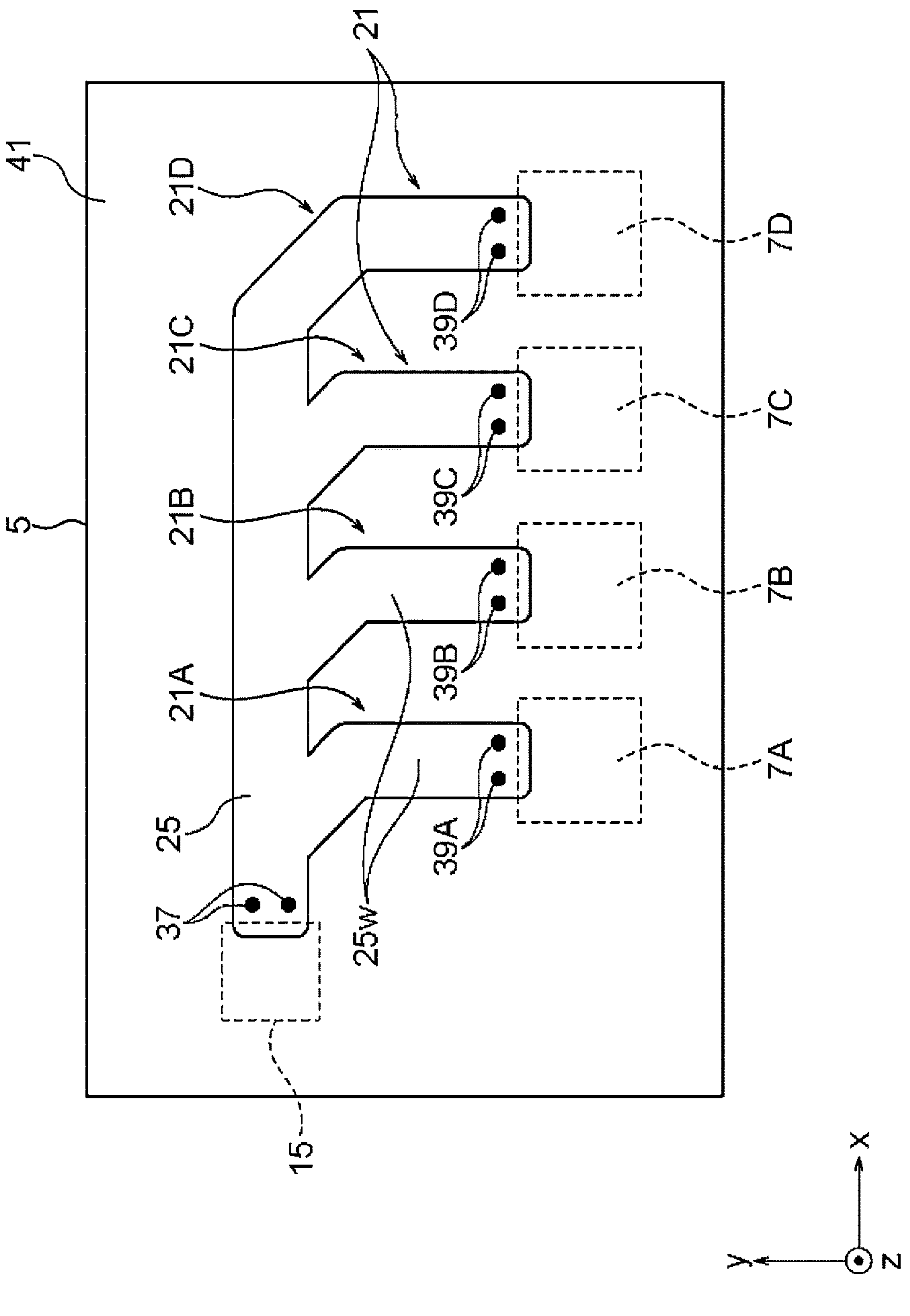
FIG. 5 is a schematic diagram illustrating an example of multiple wiring lines disposed inside the module substrate in FIG. 4.

FIG. 5 is a schematic diagram illustrating an example of multiple wiring lines 21 (more specifically, first to fourth wiring lines 21A to 21D) of the module substrate 5.

The multiple wiring lines 21 connect the power supply IC 15 to the multiple optical ICs 7 (specifically, first to fourth optical ICs 7A to 7D). More precisely, FIG. 5 is a schematic plan view illustrating a layer inside the module substrate 5, which is configured as a multilayer substrate. The power supply IC 15 and the multiple optical ICs 7 are represented by dotted lines.

The multiple optical ICs 7 are disposed at different positions from each other. Therefore, there is a high likelihood that the relative positions of the multiple optical ICs 7 with respect to the single power supply IC 15 will be different from each other. When the relative positions are different from each other, the multiple wiring lines 21 (in the illustrated example, the parts of the wiring lines 21 on the power supply IC 15 side are configured as a common part) extend through different lengths from the power supply IC 15 to the corresponding optical ICs 7.

When the multiple wiring lines 21 have different lengths from each other, the resistance values of the multiple wiring lines 21 are different from each other, and as a result, variations occur in the voltage and/or current drop in the multiple wiring lines 21. In other words, the longer the wiring lines 21 are, the higher the resistance values and the larger the drops. Variations will also occur in the power (voltage and/or current) supplied to the multiple optical ICs 7. As a result, for example, the likelihood of a malfunction occurring in any one of the optical ICs 7 is increased.

Therefore, the module substrate 5 is structured so as to bring the resistance values of the multiple wiring lines 21 having different lengths from each other closer together. For example, the module substrate 5 is structured so that the relatively longer wiring lines 21 have substantially larger cross-sectional areas along part or the entirety of the paths of the wiring lines 21. This is described more specifically below.

Figure 6:
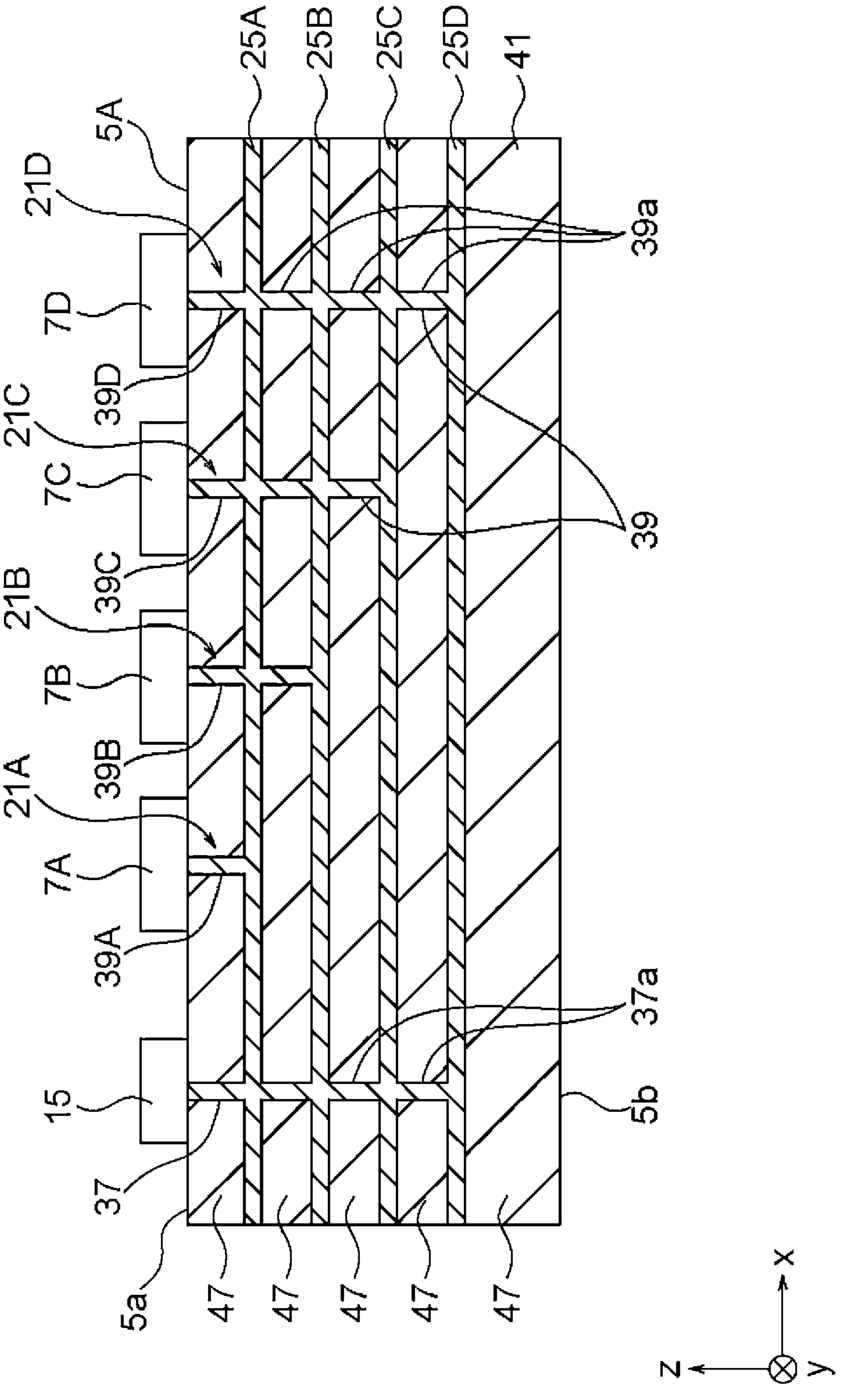
FIG. 6 is a diagram illustrating an example of the cross-sectional structure of the module substrate in FIG. 4.

FIG. 6 is a sectional view of a module substrate 5A as an example of the module substrate 5. FIG. 6 is a sectional view viewed in a direction indicated by a line VI-VI in FIG. 1. Since FIG. 6 is a schematic diagram, the figure also illustrates configurations that are not located in the same cross-section as each other.

As illustrated in this figure, the module substrate 5A includes multiple conductor layers 25 (first to fourth conductor layers 25A to 25D) thereinside. The planar shape of each conductor layer 25 is the same as or similar to the planar shape of the conductor layer 25 illustrated in FIG. 5, for example. The power supply IC 15 is electrically connected to the multiple conductor layers 25 by (at least one) via conductor 37. Each optical IC 7 is electrically connected to at least one conductor layer 25 by (at least one) via conductor 39 (specifically, any one of first to fourth via conductors 39A to 39D). That is, each wiring line 21 includes a via conductor 37, at least one conductor layer 25, and a via conductor 39.

Here, the longer each wiring line 21 is, the greater the number of conductor layers 25 through which the wiring line 21 extends. For example, the first wiring line 21A connecting the power supply IC 15 to the first optical IC 7A extends through only the first conductor layer 25A, whereas the second wiring line 21B connecting the power supply IC 15 to the second optical IC 7B extends through the first conductor layer 25A and the second conductor layer 25B. Thus, the relatively longer wiring lines 21 have substantially larger cross-sectional areas.

By bringing the resistance values of the multiple wiring lines 21 of different lengths closer to each other, the variations in the power (voltage and/or current) supplied to the multiple optical ICs 7 can be reduced. As a comparative example, for example, the cross-sectional areas of the multiple wiring lines 21 are made identical to each other, and the lengths of the multiple wiring lines 21 are made identical by causing the wiring lines 21 connected to the optical ICs 7 that are closer to the power supply IC 15 to take a longer path in plan view. Compared to such a configuration, for example, the paths of the wiring lines 21 can be simplified and the shortest paths in plan view can be used. This is also advantageous in terms of reducing the area of module substrate 5, for example.

Let us consider yet another comparative example. In this comparative example, the cross-sectional area of each wiring line 21 is assumed to be constant along the entire length of the wiring line 21 and the multiple wiring lines 21 are assumed to have the same cross-sectional area as each other. In this comparative example, the ratio of the resistance values of the wiring lines 21 is the same as the ratio of the lengths of the wiring lines 21. For example, the resistance value of the first wiring line 21A is R1, the resistance value of the second wiring line 21B is R2, the length of the first wiring line 21A is L1, and the length of the second wiring line 21B is L2. In addition, $L2>L1$. Here, $L1:L2=R1:R2$. From another perspective, the ratio of the lengths of the wiring lines corresponds to the ratio of the resistance values of the wiring lines, $L2/L1=R2/R1$, or $R2=L2/L1\times R1$, and therefore the absolute value of the difference between the resistance values $|R2-R1|$ is $(L2-L1)/L1\times R1$.

Therefore, in contrast to the above comparative example, the module substrate 5 according to the embodiment can be said to be structured so that $L2>L1$ and $|R2-R1|$ is smaller than $(L2-L1)/L1\times R1$. More precisely, for example, $|R2-R1|$ may be less than or equal to 9/10, less than or equal to 2/3, less than or equal to 1/2, less than or equal to 1/3, less than or equal to 1/5, or less than or equal to 1/10 of $(L2-L1)/L1\times R1$. Ideally, R2 and R1 are identical (an allowable difference may still exist when this is said). Although the first and second wiring lines 21A and 21B have been taken as examples, the above description may be applied to any two of the wiring lines 21.

An overview of the First Embodiment has been given above. Hereafter, brief descriptions will be given in the following order.

1. Overall Configuration of Optical Module 1 (FIGS. 1 and 2)
2. Example of Processing Performed by Optical ICs 7 and Control IC 13 (FIG. 3)
3. Configuration of Wiring Lines 21 (FIGS. 4 to 6)
4. Summary of First Embodiment

1. OVERALL CONFIGURATION OF OPTICAL MODULE

The optical module 1 illustrated in FIGS. 1 and 2 is, for example, electrically connected to an external electronic device (for example, a motherboard 3 represented by dotted lines in FIG. 2). In addition, the optical module 1 is optically connected to an optical element that is external to the optical module 1 (for example, an optical waveguide, which is not illustrated). The optical module 1 contributes to the transmission of signals between the motherboard 3 and a counterpart device, which is not illustrated, connected to an end of the optical waveguide (or a counterpart device including the waveguide. Same applies hereafter). From another perspective, the optical module 1 contributes to the transmission of information between the motherboard 3 and the counterpart device.

In addition to optical fibers, optical waveguides include elements having sheet-like or plate-like structures. The optical module 1 may be optically connected to an external light-emitting or light-receiving element without an external optical waveguide interposed therebetween. However, in the description of this embodiment, the description may be made with the assumption that the optical module 1 is connected to an external optical waveguide. The optically connected counterpart device may be, for example, another electronic device that optically communicates with an electronic device containing the motherboard 3, or may be a device inside an electronic device containing the motherboard 3.

The division of roles between the motherboard 3 and the optical module 1 may be set as appropriate. For example, the optical module 1 only contributes to the transmission of information and does not substantially modify the information contained in input and/or output optical signals. Furthermore, the optical module 1 performs only photoelectric conversion and amplification of signals and does not modulate and/or demodulate signals, change the frequency of signals, filter signals, or perform AD conversion of signals. However, at least some of the processing mentioned above that is not performed by the optical module 1 may be performed by the optical module 1. Optical signals and/or electrical signals input to and/or output from the optical module 1 may be, for example, binary digital signals or signals of other formats.

To realize the above operations, the optical module 1 includes, for example, the following components.

- 1.1. Module Substrate 5 (Already Described)
- 1.2. Optical ICs 7 (Already Described)
- 1.3. Multiple (Same Number As Optical ICs 7) Fiber Bundles 9 Extending Out From Multiple Optical ICs 7
- 1.4. Multiple (Same Numbers as Fiber Bundles 9) Optical Connectors 11 Located on Opposite Side of Multiple Fiber Bundles 9 from Multiple Optical ICs 7
- 1.5. At Least One (One in Illustrated Example) Control IC 13 Mounted on Module Substrate 5 and Controlling Multiple Optical ICs 7
- 1.6. Power Supply IC 15 (Already Described)
- 1.7. Electrical Connector 17 Mounted on Module Substrate 5 and Electrically Connected to Electronic Device External to Optical Module 1 (Here, Motherboard 3)
- 1.8. Passive Component 19 Mounted on Module Substrate 5

The optical module 1 may include components not listed above. For example, although not specifically illustrated, the optical module 1 may include a cooling component (for example, a heat sink) configured to contribute to cooling of the multiple optical ICs 7. The heat sink may be constructed, for example, of a metal that makes contact with the illustrated configuration from the +z side. Conversely, the optical module 1 does not need to include any of the illustrated components (for example, the control IC 13 and/or the passive component 19).

Each fiber bundle 9 includes multiple (four in the illustrated example) optical fibers 23 extending parallel to each other. In other words, each optical IC 7 is capable being input with and/or outputting optical signals through multiple channels. The optical module 1 can be input with and/or output optical signals in a number of channels that is the sum of the number of channels of the multiple optical ICs 7. However, unlike in the illustrated example, each optical IC 7 may be used for only one channel.

As well as the multiple optical ICs 7, the control IC 13, the power supply IC 15, and the electrical connector 17 are also mounted on the module substrate 5. This enables, for example, the optical module 1 to have increased functionality and decreased size. The mounting of the ICs (7, 13, 15, etc.) may be realized, for example, by bonding the ICs to the module substrate 5 by using a conductive bonding material (not illustrated) such as solder (including lead-free solder). However, the ICs may be disposed on module substrate 5 in a removable manner by using connectors.

In the present disclosure, when the ICs are said to be positioned on the module substrate and so on, the number of ICs may be counted based on units of direct mounting on the module substrate 5. For example, all of multiple optical ICs 7 are not conceptualized as a single IC. Conversely, even if a single optical IC 7 contains multiple IC chips, that one optical IC 7 is not regarded as multiple ICs.

Hereafter, the configurations of the components of the optical module 1 will be briefly described in the order listed above while referring to FIGS. 1 and 2.

(1.1. Module Substrate (Except for Specific Configurations of Wiring Lines))

The module substrate 5 is, for example, a flat plate-shaped member. The front and rear surfaces of the flat plate (In other words, the widest surfaces. Main surfaces.) are a first surface **5*a* and a second surface 5*b*, respectively, on which electronic components (optical ICs 7 and so on) are mounted. The module substrate 5 is composed of, for example, a rigid printed wiring board. In the rigid printed wiring board, the basic configuration (excluding specific configurations such as that of the paths of the wiring lines 21**) may be any of various configurations, for example, may be a known configuration.

For example, the printed wiring board may be a double-sided board or a multilayer board that allows mounting of electronic components (such as the optical ICs 7 in this case) on both the front and rear surfaces. A double-sided board consists of a plate-shaped insulating body 41 (symbols appear in FIGS. 4 to 6) and the conductor layers 25 stacked both surfaces of the insulating body 41 (Not illustrated in FIGS. 1 and 2. Reference symbols appear in FIGS. 4 to 6). A multilayer board includes the plate-shaped insulating body 41 and three or more conductor layers 25 positioned on both surfaces of and inside the insulating body 41. The conductor layers 25 may be, for example, connected to each other by via conductors that penetrate through part of or the entire thickness of the insulating body 41 (see, for example, the via conductors 37 and 39 in FIGS. 4 to 6). The conductor layers 25 on the front and rear surfaces of the insulating body may be partially covered by an insulating film (solder resist).

In this embodiment, the printed wiring board is configured as a double-sided board or a multilayer board in order to implement the multiple wiring lines 21 that extend through different numbers of conductor layers 25 from each other. However, in other embodiments, the printed wiring board may be a single-sided board with a conductor layer formed on only one surface of the board-shaped insulating body.

For example, in a printed wiring board, the material of the insulating body 41 and the material of the conductors may be chosen as appropriate. For example, the insulating body 41 may be composed of an organic material or an inorganic material or a combination of an organic material and an inorganic material. More specifically, the insulating body 41 may consist of, for example, a base material, such as glass cloth, impregnated with resin, or may be composed of a ceramic. The conductor may be a metal such as copper. Each conductor layer 25 may be, for example, substantially entirely composed of the same material, or may be composed of two or more layers, some or all of which are composed of different materials, stacked on top of each other. The via conductors (37 and 39, etc.) may be, for example, entirely composed of the same material or may be composed of different materials on the inner side and the outer side thereof The conductors (conductor layers and via conductors) of the module substrate 5 may include parts that play appropriate roles. For example, the conductors may include lands on which the various electronic components (7, 13, 15, 17, and 19) are mounted and wiring lines connecting the lands to each other. The lands may be pads for surface mounting or may be for through-hole mounting. In addition to the above, the conductors may also include portions constituting electronic elements. The electronic elements may, for example, be passive elements such as resistors, inductors, or capacitors.

The planar shape and various dimensions of module substrate 5 may be set as appropriate in accordance with the number and size of electronic components (such as the optical ICs 7) to be mounted on the module substrate 5. In the illustrated example, the planar shape of the module substrate 5 is rectangular with four sides parallel to the x direction or the y direction. As an example of the dimensions in the optical module 1 having a relatively small size, the length of each side of the module substrate 5 in plan view is greater than or equal to 30 mm and less than or equal to 50 mm. If the module substrate 5 is not rectangular in shape, each side of the smallest rectangle encompassing the module substrate 5 may satisfy the above dimensional range.

(1.2. Optical ICs)

The multiple optical ICs 7 have the same configuration, for example. Unlike in the illustrated example, the configuration of at least some of the optical ICs 7 may be different from the configuration of other optical ICs 7 in terms of the internal configuration and/or the visible external configuration. For example, some of the optical ICs 7 may be for transmitting optical signals and the remaining optical ICs 7 may be for receiving optical signals. The number of channels of some optical ICs 7 may be different from the number of channels of other optical ICs 7. For convenience, the description of this embodiment may be made with the assumption that the multiple optical ICs 7 have the same configuration as each other.

Each optical IC 7 is, for example, basically, a thin (length in the z direction is smaller than lengths in the x direction and y direction) rectangular parallelepiped shaped component. The fiber bundle 9 (multiple optical fibers 23) extends out from one surface (−y side) of the rectangular body. The optical IC 7 performs photoelectric conversion on multiple optical signals carried by the multiple optical fibers 23. The optical IC 7 may include, for example, an electronic element such as a photoelectric conversion element (described below) and a package 7*a* that houses the electronic element. The size of the optical IC 7 (package 7*a*) may be set as appropriate in accordance with the number and diameter of the optical fibers 23 and the number and size of the electronic elements contained therein.

Except for the feature that the optical fibers 23 extend out from the package 7*a*, the configuration of the package 7*a* of the optical IC 7 may be any of various configurations, for example, may be the same as or similar to a known configuration. For example, the material of a sealing portion 7*b* of the package 7*a* may be a ceramic or a resin. The package 7*a* may be configured to be surface mounted (illustrated example) or through-hole mounted. In the case of surface mounting, terminals 7*c* may be pins (illustrated example) or pads (or bumps bonded to pads). The shape and number of the pins may be freely chosen. In FIG. 1, an example is illustrated in which pins serving as terminals extend out from two side surfaces along the yz-plane.

In the illustrated example, the multiple optical ICs 7 are mounted together on the first surface 5*a* of the module substrate 5. The multiple optical ICs 7 are mounted so that the fiber bundles 9 extend out in the same direction as each other. The multiple optical ICs 7 are mounted at different positions in a direction perpendicular to the direction in which the fiber bundles 9 extend (x direction) so that the multiple fiber bundles 9 do not overlap each other. The multiple optical ICs 7 are arranged in a single row in the x direction. In other words, the multiple optical ICs 7 are at the same position as each other in the y direction. The pitch of the arrangement is constant.

Unlike in the illustrated example, there may be optical ICs 7 that are mounted on the second surface 5*b* (see FIG. 11 described later). The orientations of the multiple optical ICs 7 (the direction in which the fiber bundles 9 extend out) may be different from each other. The multiple fiber bundles 9, etc., may overlap each other. In the case where the multiple optical ICs 7 have the same orientation as each other, the positions of the multiple optical ICs 7 in the y direction (the direction in which the fiber bundles 9 extend out) may be different from each other (the multiple optical ICs 7 do not need to be arranged in a single row). The pitch of the multiple optical ICs 7 may be freely chosen. In the description of the position of an electronic component in plan view, for example, the position of the geometric center of the electronic component in plan view may be referred to, unless otherwise noted.

The number of optical ICs 7 may be any number greater than or equal to 2. In the illustrated example, four optical ICs 7 are illustrated. This is merely an example, and for example, the number of optical ICs 7 may be two, or may be ten or more. An odd number or an even number is acceptable.

Each optical IC 7 may be supplied with multiple types of power with different voltages and/or currents, or only one type of power, as will be described later in the description of the power supply IC 15. In the former case, the optical ICs 7 may use multiple types of power for different applications. For example, although not specifically illustrated, the optical ICs 7 may distribute multiple types of power to at least two or more of the following: internal core logic circuits, I/O (input/output) circuits, auxiliary logic circuits, circuits that apply a voltage to photoelectric conversion elements 33 (described later), and memories.

(1.3. Fiber Bundles)

For example, the fiber bundles 9 have the same configuration as each other. Unlike in the illustrated example, at least some of the fiber bundles 9 may have a different configuration from other fiber bundles 9. For example, the number of optical fibers 23 contained in some fiber bundles 9 may be different from the number of optical fibers 23 contained in other fiber bundles 9. For example, the length of some fiber bundles 9 may be different from the length of other fiber bundles 9.

In each fiber bundle 9, the multiple optical fibers 23 may be bundled together and covered by a sheath, or not bundled together. FIGS. 1 and 2 illustrate the case where a sheath is not provided so the fact that the fiber bundle 9 includes the optical fibers 23 is clearly illustrated. As is clear from the fact that the multiple optical fibers 23 do not need to be bundled together, the multiple optical fibers 23 are not required to extend parallel to each other when the multiple optical fibers 23 are said to extend in parallel.

The number of optical fibers 23 contained in each fiber bundle 9 may be any number greater than or equal to two. In the illustrated example, four optical fibers 23 are illustrated. This is merely an example, and for example, the number of optical fibers 23 contained in each fiber bundle 9 may be two or ten or more. An odd number or an even number is acceptable.

In each fiber bundle 9, the arrangement of the optical fibers 23 in a transverse section of the fiber bundle 9 may be freely chosen. In the illustrated example, all the optical fibers 23 are arranged in a single row in one radial direction (x direction) of the optical fibers 23, at least inside the optical IC 7 and inside the optical connector 11. Within the optical IC 7, the arrangement direction of the optical fibers 23 is, for example, the longitudinal direction of the side surface (surface on −y side) of the optical IC 7, or from another perspective, along the first surface 5*a* of the module substrate 5. Unlike in the illustrated example, the optical fibers 23 may be arranged in two or more rows or may be disposed in a manner that does not conform to the concept of an array.

The configuration of each optical fiber 23 may be any of various configurations, and for example, may be any known configuration. For example, although not specifically illustrated, the optical fiber 23 includes a core and a cladding, the cladding covering the core and having a higher refractive index than the core. The core and the cladding are composed of translucent materials (for example, quartz glass, or plastic). The optical fiber 23 may further includes a coating composed of an appropriate material (for example, resin or fiber) covering the cladding. For example, the optical fibers 23 may be single-mode or multimode optical fibers. The diameter of the optical fibers 23 may be any diameter.

The optical fibers 23 have a certain degree of flexibility, for example. Consequently, the fiber bundles 9 are flexible. Thus, the optical connectors 11 can be oriented in various directions other than the orientation illustrated in the drawings. In the illustrated example, the multiple optical fibers 23 are arranged in the x direction, and are therefore relatively easy to deform and bend in the z direction.

Each fiber bundle 9 is fixed to the corresponding optical IC 7 in a non-removable manner, for example. In other words, the fiber bundle 9 cannot be separated from the optical IC 7 without damaging the optical IC 7. For example, the fiber bundle 9 and the sealing portion 7*b* are fixed to each other by an adhesive or by direct adhesion and/or by the sealing portion 7*b* being tightened on the fiber bundle 9. The fiber bundle 9 and the corresponding optical connector 11 may be fixed to each other in a similar manner. However, the optical connector 11 may be configured by two or more members being fixed to each other by screws or the like, and some or all of the members may be separable from the fiber bundle 9.

(1.4. Optical Connectors)

The optical connectors 11 are removably connected to counterpart connectors (not illustrated) of optical waveguides (not illustrated) external to the optical module 1, and optically connect the optical ICs 7 to the external optical waveguides. The multiple optical connectors 11 have the same configuration, for example. Unlike in the illustrated example, at least some of the optical connectors 11 may have a different configuration from other optical connectors 11.

The configuration of each optical connector 11 (and counterpart connector) may be any of various configurations, and for example, may be any known configuration. For example, the optical connector 11 and the counterpart connector may be positioned in the radial direction of the optical fibers 23 by inserting (fitting) one housing into another housing and/or may be positioned in the radial direction of the optical fiber 23 by inserting (fitting) a guide pin provided in one connector into a guide hole provided in another connector. The end surface of each optical fiber 23 and the end surface of the corresponding external optical waveguide may face each other directly or may be optically connected to each other via an optical component (for example, a lens) in at least one of the connectors.

(1.5. Control IC)

The control IC 13 is mounted on the module substrate 5 and electrically connected to at least one of the optical ICs 7 through conductors (wiring lines) on and in the module substrate 5. The control IC 13 inputs control signals to the at least one optical IC 7. The specific operation of the optical IC 7 controlled by the control IC 13 may be any of various operations, and an example will be described while referring to FIG. 3 below.

The number of control ICs 13 may be any number. In the illustrated example, only one control IC 13 is provided, and the one control IC 13 controls all of the optical ICs 7. Unlike in the illustrated example, for example, the same number of control ICs 13 as the number of optical ICs 7 may be provided, and a single control IC 13 may control only one optical IC 7. For example, the number of control ICs 13 may be two or more, but less than the number of optical ICs 7, or the number of control ICs 13 may be greater than the number of optical ICs 7. From another perspective, the number of optical ICs 7 to be controlled may differ from one control IC 13 to another control IC 13, or two or more control ICs 13 may each control one optical IC 7 in different manners from each other. As described above, the optical module 1 may include at least one control IC 13 configured to control at least one optical IC 7.

As is understood from the above description, in the case where multiple control ICs 13 are provided, the configurations of the multiple control ICs 13 may be identical to each other or different from each other in terms of the internal configuration and/or the visible external configuration. The configuration of the control IC 13 may be any of various configurations, for example, the configuration may be of any known configuration, except for the specific configurations relating to processing contents and so on. The description of the package 7*a* of the optical ICs 7 described above may be applied to the package of the control IC 13 (reference symbol omitted) so long as no contradictions arise. Unlike the optical ICs 7, the control IC 13 may be provided with pin-like terminals (reference symbol omitted) on four side surfaces thereof, unlike in the illustrated example, since the fiber bundle 9 does not extend out from the control IC 13.

The position at which the control IC 13 is mounted may be freely chosen. In the illustrated example, the control IC 13 is mounted on the first surface 5*a*. In other words, the control IC 13 is mounted on the same mounting surface as the mounting surface on which the multiple optical ICs 7 are mounted. Unlike in the illustrated example, one or more control ICs 13 may be mounted on the second surface 5*b*. The multiple control ICs 13 may be mounted in a distributed manner on the first surface 5*a* and the second surface 5*b*.

(1.6. Power Supply IC)

The power supply IC 15 is mounted on module substrate 5 and electrically connected to at least one optical IC 7 through conductors (wiring lines 21) on and in the module substrate 5. The power supply IC 15 supplies power to the at least one optical IC 7.

The number of power supply ICs 15 may be freely chosen. The number of optical ICs 7 supplied with power from one power supply IC 15 may also be freely chosen. In the optical module 1 according to an embodiment, however, at least one power supply IC 15 independently supplies power to two or more optical ICs 7. The previous description of the length of the wiring lines 21 made with reference to FIGS. 5 and 6 is focused on the power supply IC 15 that supplies power to two or more optical ICs 7 in this manner. In other words, for example, there may or not be power supply ICs 15 and wiring lines 21 other than the power supply IC 15 and wiring lines 21 that are described. For example, when there are power supply ICs 15 and wiring lines 21 other than those described, the configurations referred to in FIGS. 5 and 6 may apply or not apply to the power supply ICs 15 and the wiring lines 21 other than those described.

One power supply IC 15 may be capable of supplying multiple types of power with different voltages or currents from each other, or may be capable of supplying only one type of power. The power supply IC 15 of the former mode that supplies power to two or more optical ICs 7 is, for example, typically realized in a first mode and a second mode below. In the first mode, each of two or more types of power (all or some of the types that can be supplied) are supplied to two or more optical ICs 7. For example, a power supply IC 15 capable of supplying power of voltages V1 and V2 supplies the voltage V1 to two or more optical ICs 7 via two or more wiring lines 21, and also supplies the voltage V2 to the same two or more optical ICs 7 via two or more wiring lines 21 different from the former two or more wiring lines 21. In the second mode, the types of power supplied to the two or more optical ICs 7 are different from each other.

Regardless of the number of types of power that can be supplied by the power supply IC 15, the previous description relating to the lengths of the wiring lines 21 made with reference to FIGS. 5 and 6 focused on a path along which one type of power is supplied to two or more optical ICs 7. For example, the description relating to the wiring lines 21 may be description of multiple wiring lines 21 connected to a power supply IC 15 that can supply only one type of power, or a description of multiple wiring lines 21 connected to a power supply IC 15 that can supply multiple types of power, each wiring line 21 corresponding to only one type of power. In other words, there may or not be wiring lines 21 corresponding to different types of power than the types of power corresponding to the wiring lines 21 that are described. When there are wiring lines 21 corresponding to different types of power than the types of power that are described, the configurations referred to in FIGS. 5 and 6 may hold true or not hold true for the wiring lines 21 other than the ones described.

In the illustrated example, only one power supply IC 15 is provided and the one power supply IC 15 supplies power to all the optical ICs 7. As is understood from the above description, this power supply IC 15 may, for example, supply only one type of power to all of the optical ICs 7, or may supply each of two or more types of power to all of the optical ICs 7.

As is understood from the previous description, the number of power supply ICs 15 may be different from that in the illustrated example. For example, two or more power supply ICs 15 may be provided, with each power supply IC 15 supplying power to all the optical ICs 7. In this case, the power supplied by each power supply IC 15 may be one type of power, for example, and the multiple power supply ICs 15 may supply different types of power from each other. For example, two or more power supply ICs 15 may be provided, and the power supply ICs 15 may supply different optical ICs 7 from each other with power. In this case, the one or more types of power supplied by the power supply ICs 15 may be the same type of power among the power supply ICs 15, or some or all of the types of power may be different from each other.

As is understood from the above description, regarding a case in which multiple power supply ICs 15 are provided, the configurations of the multiple power supply ICs 15 may be identical to each other or different from each other in terms of the internal configuration and/or the visible external configuration. The configurations of the power supply ICs 15 may be any of various configurations, for example, the configurations may be any known configuration, except for the specific configurations relating to contents of the roles of the power supply ICs 15 and so on. The description of the package 7*a* of the optical ICs 7 described above may be applied to a package 15*a* of the power supply ICs 15, as long as no contradictions or the like arise. In this case, the terms "sealing portion 7*b*" and "terminals 7*c*" may be replaced by "sealing portion 15*b*" and "terminals 15*c*". Unlike the optical ICs 7, each power supply IC 15 may be provided with pin-like terminals (reference symbol omitted) on four side surfaces thereof, unlike in the illustrated example, because the fiber bundle 9 does not extend out from the power supply IC 15.

The power supply IC 15 may be configured as a DC (Direct Current)/DC converter for example. For example, the power supply IC 15 converts DC power supplied from the outside (motherboard 3) via the electrical connector 17 into DC power of an appropriate voltage or current and supplies the DC power to the optical ICs 7. The power supply IC 15 may be, for example, a constant-voltage power supply or a constant-current power supply. Unlike in the above description, the power supply IC 15 may be a converter other than a DC/DC converter. The power supply IC 15 may contribute or not contribute to supplying power to the control IC 13. Unlike in the illustrated example, another power supply IC may be interposed between the electrical connector 17 and the power supply IC 15.

The position at which the power supply IC 15 is mounted may be freely chosen. In the illustrated example, the power supply IC 15 is mounted on the first surface 5*a*. In other words, the power supply IC 15 is mounted on the same mounting surface as the mounting surface on which the multiple optical ICs 7 are mounted. Unlike in the illustrated example, one or multiple power supply ICs 15 may be mounted on the second surface 5*b* (the surface on which the optical ICs 7 are not mounted). In addition, multiple power supply ICs 15 may be mounted in a distributed manner on the first surface 5*a* and the second surface 5*b* (see FIG. 11 described below).

(1.7. Electrical Connector)

The electrical connector 17 is removably connected to a counterpart connector (not illustrated) of the motherboard 3 (or to a cable interposed between the motherboard 3 and the optical module 1), and electrically connects the module substrate 5 to the motherboard 3. The electrical connector 17 (from another perspective, the motherboard 3 connected to the electrical connector 17) is electrically connected to the electronic components mounted on the module substrate 5 via the conductors (wiring lines) of the module substrate 5. For example, the electrical connector 17 is connected to the optical ICs 7, the control IC 13, and the power supply IC 15 directly or indirectly via other electronic elements. The other electronic elements are, for example, active elements or passive elements mounted on the module substrate 5, or passive elements consisting of the conductors of the module substrate 5.

The number of electrical connectors 17 may be freely chosen. In the illustrated example, only one electrical connector 17 is provided. Unlike in the illustrated example, when two or more electrical connectors 17 are provided, the two or more electrical connectors 17 may be connected to the same device (here, the motherboard 3) or to different devices.

The position at which the electrical connector 17 is mounted may be freely chosen. In the illustrated example, the electrical connector 17 is mounted on the second surface 5*b* (the surface on which the optical ICs 7 are not mounted) and mates with the connector of the counterpart device in the z direction. Unlike in the illustrated example, one or more electrical connectors 17 may be mounted on the first surface 5*a* (the surface on which the optical ICs 7 are mounted) or may be disposed at the edge of the module substrate 5 and mate with the electrical connectors of counterpart devices in a direction extending along the module substrate 5. In addition, multiple electrical connectors 17 may be mounted in a distributed manner on the first surface 5*a* and the second surface 5*b*.

The configuration of each electrical connector 17 (and counterpart connector) may be any of various configurations, and for example, may be any known configuration. For example, the electrical connector 17 and the counterpart connector may be positioned with respect to each other by inserting (fitting) one housing into another housing and/or by contact between terminals. For example, the electrical connector 17 and the counterpart connector may be electrically connected to each other by inserting multiple pin-like terminals of one connector into multiple tubular terminals of another connector, or may be electrically connected to each other by multiple layer-like terminals formed on the surface of the substrate of one connector contacting plate spring terminals provided in recesses of another connector.

(1.8. Passive Component)

The passive component 19 is, for example, a resistor, a capacitance element, or an inductor. One passive component 19 may be, for example, interposed between any two of the electrical connector 17, the optical ICs 7, the control IC 13, and the power supply IC 15 in order to contribute to impedance matching. The number, function (resistor, capacitance element, or inductor, etc.), shape (chip type, etc.), size, mounting method (surface mounting or through-hole mounting, etc.) and mounting position of the passive component 19 may be freely chosen.

2. EXAMPLE OF PROCESSING OF OPTICAL IC AND CONTROL IC

Figure 3:
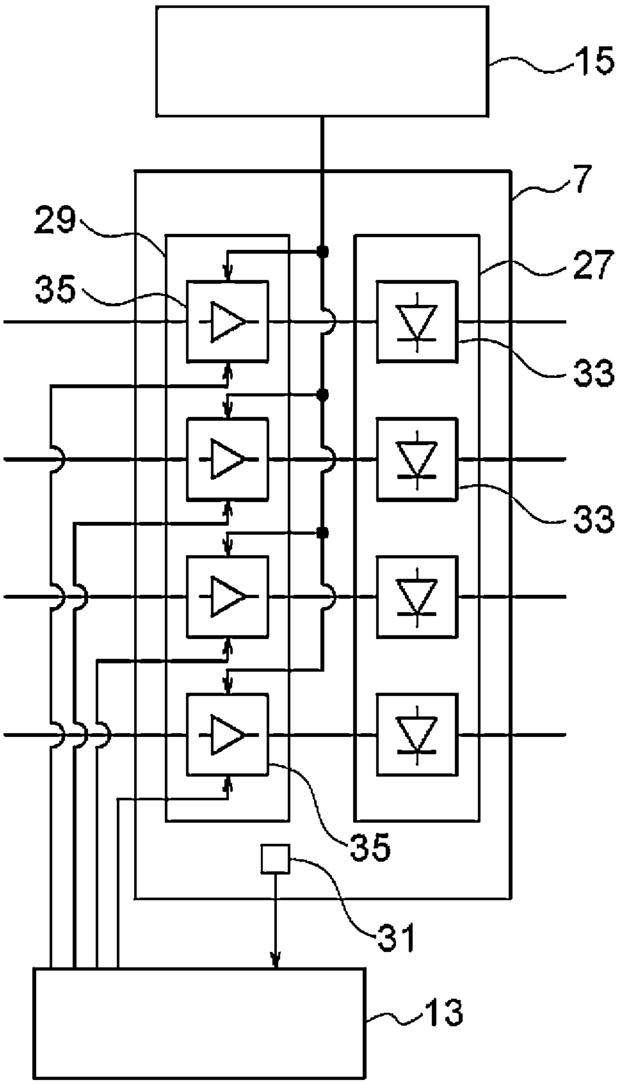
FIG. 3 is a schematic diagram illustrating an example of the configuration of the signal processing system of part of the optical module in FIG. 1.

FIG. 3 is a block diagram illustrating an example configuration of the signal processing system of the optical module 1. Here, one optical IC 7, one control IC 13, and one power supply IC 15 are illustrated.

The optical IC 7 includes, for example, a conversion unit 27 that is directly responsible for photoelectric conversion, a processing unit 29 that processes electrical signals relating to the conversion unit 27, and a sensor 31 that detects the temperature.

The conversion unit 27 includes the same number of photoelectric conversion elements 33 as the number of channels (number of optical fibers 23 connected to one optical IC 7). The photoelectric conversion elements 33 are, for example, laser diodes for transmission of optical signals or photodiodes for reception of optical signals. Each laser diode generates an optical signal in accordance with an electrical signal input from the processing unit 29 and outputs the optical signal to the corresponding optical fiber 23. Each photodiode generates an electrical signal in accordance with an optical signal input from the corresponding optical fiber 23 and outputs the electrical signal to the processing unit 29.

The processing unit 29, for example, includes the same number of individual circuits 35 as the number of channels. The multiple individual circuits 35 are individually connected (in a one-to-one manner) to the multiple photoelectric conversion elements 33. The individual circuits 35 are driving circuits for transmission of optical signals or amplification circuits for reception of optical signals. Each driving circuit outputs an electrical signal in accordance with an electrical signal input from outside the optical module 1 via the electrical connector 17 to the corresponding photoelectric conversion element 33. Each amplification circuit amplifies an electrical signal input from the corresponding photoelectric conversion element 33 and outputs the amplified electrical signal to outside the optical module 1 via the electrical connector 17.

The relationship between the above configuration from a signal processing perspective and the configuration of the optical ICs 7 from a hardware perspective may be freely chosen. For example, the multiple photoelectric conversion elements 33 may be fabricated as separate elements and then mounted on the same substrate, or may be fabricated on the same substrate. The multiple individual circuits 35 may be fabricated as separate IC chips and then mounted on the same substrate, or they may be fabricated within a single IC chip. The conversion unit 27 and the processing unit 29 may be fabricated as separate chips and then mounted on the same substrate, or may be fabricated within the same chip as each other. This also applies to the sensor 31.

The sensor 31 outputs an electrical signal according to the temperature to the control IC 13. The control IC 13 controls the individual circuits 35 based on the temperature detected by the sensor 31, in order to compensate for changes in the characteristics of the photoelectric conversion elements 33 caused by temperature changes, for example. Specifically, for example, each individual circuit 35 applies a bias to the anode or cathode of the corresponding photoelectric conversion element 33 with a voltage or current according to a value stored in a register of the individual circuit 35. The control IC 13 rewrites the values stored in the registers in accordance with the values detected by the sensor 31. In this way, temperature-induced changes in the relative relationship between the strength of an optical signal and the strength of an electrical signal can be reduced.

The configuration, number, and position of the sensor 31 may be freely chosen. For example, the sensor 31 consists of a thermistor or resistance thermometer whose electrical resistance changes in accordance with temperature. The sensor 31 may include only a transducer or, in addition to a transducer, may include a circuit that performs prescribed processing (for example, amplification). Only one sensor 31 may be provided for one optical IC 7 (illustrated example), or multiple sensors 31 may be provided for multiple photoelectric conversion elements 33 in an individual manner. Multiple sensors 31 may be provided in a number less than the number of photoelectric conversion elements 33, and for each photoelectric conversion element 33, the value detected by the nearest sensor 31 may be used, or a representative value of the detected values may be used.

The above example of processing may be modified as appropriate. For example, in the above description, the multiple individual circuits 35 individually applied biases to the multiple photoelectric conversion elements 33. However, a single circuit may be provided that applies a common bias to multiple photoelectric conversion elements 33. For example, the control IC 13 may generate the bias rather than the bias being generated by the processing unit 29 inside the optical IC 7.

As mentioned above, in the illustrated example, the control IC 13 is not interposed between the electrical connector 17 and the optical ICs 7. In other words, the control IC 13 does not have a function of transmitting electrical signals to be converted into optical signals and/or electrical signals converted from optical signals. However, the control IC 13 may have such a function. The control IC 13 may also have other functions, such as monitoring the current applied to the photoelectric conversion elements 33.

3. CONFIGURATION OF WIRING LINES 21

In the following description of the wiring lines 21, descriptions will be briefly given in the following order.

Figure 4:
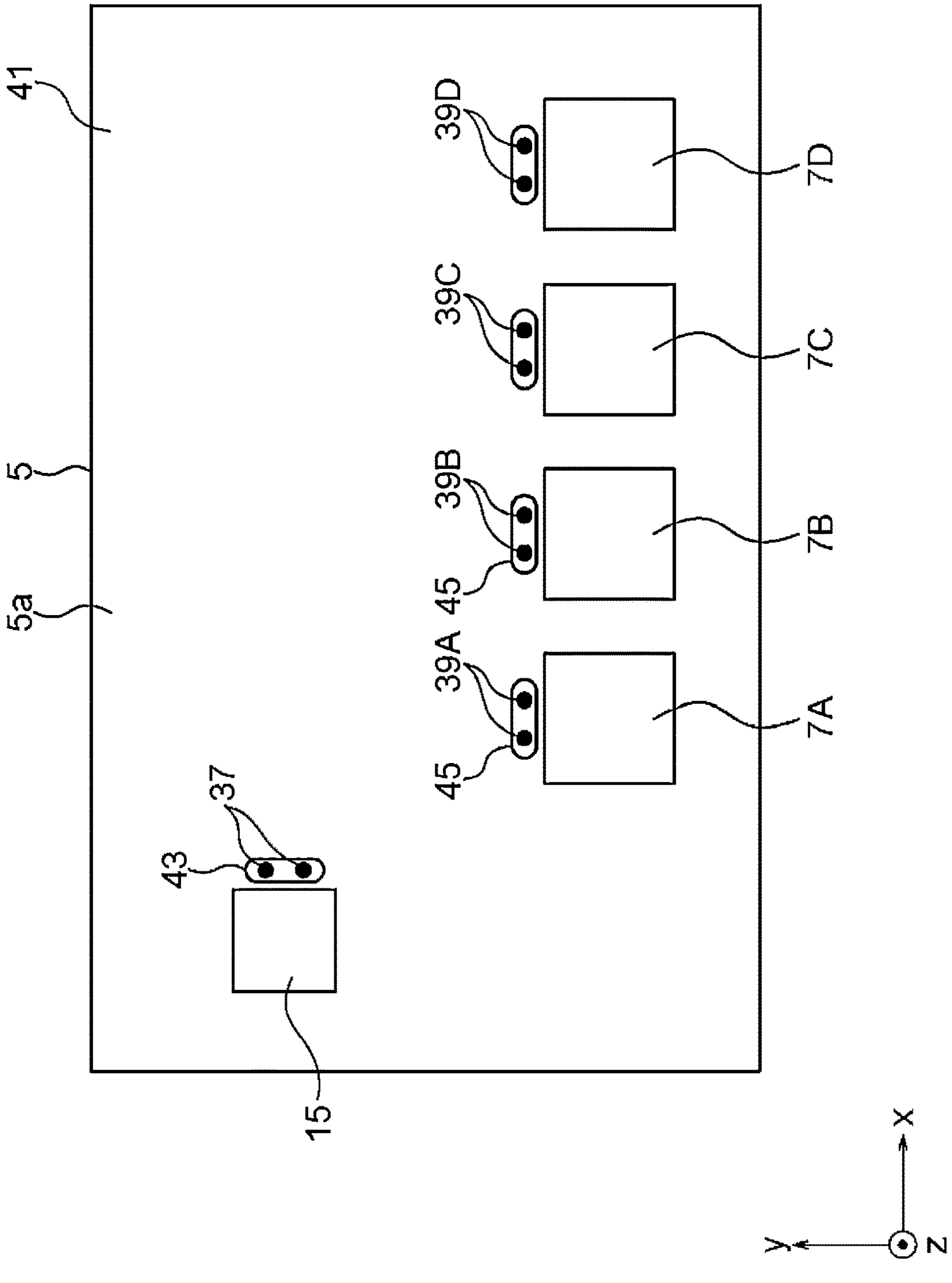
FIG. 4 is a top surface view illustrating a module substrate of the optical module in FIG. 1.

3.1. Overview of Wiring Lines 21 of Illustrated Example (FIGS. 4 to 6)

3.2. Another Example of Wiring Lines 21 (Not Illustrated)

3.3. Details of Wiring Lines 21

(3.1. Overview of Wiring Lines of Illustrated Example)

FIG. 4 is a top surface view of the module substrate 5. However, only the power supply IC 15 and the multiple optical ICs 7 are illustrated here as the components located on the first surface 5$a$. The previously mentioned via conductors 37 and 39 are also illustrated.

As already mentioned, the multiple wiring lines 21 described here relate to the same type of power supplied to the multiple optical ICs 7 from a single power supply IC 15. Here, the focus is only on wiring lines 21 whose lengths differ from each other. In other words, there may or not be wiring lines 21, which are not illustrated, that supply the same type of power to optical ICs 7, which are not illustrated, as the type of power supplied from the power supply IC 15 to the multiple illustrated optical ICs 7 and that have the same length as the illustrated wiring lines 21.

As illustrated in FIG. 4 to 6, and as previously described, each of the multiple wiring lines 21 connecting the power supply IC 15 to the multiple optical ICs 7 includes at least one via conductor 37, at least part of at least one conductor layer 25, and at least one via conductor 39. The via conductors 37 are electrically connected to the power supply IC 15 via a pad 43 (FIG. 4). The via conductors 39 are electrically connected to the optical ICs 7 via pads 45 (FIG. 4). Each conductor layer 25 includes multiple wiring line patterns 25$w$ (the patterns form a shared portion on the power supply IC 15 side) that constitute the multiple wiring lines 21. Although each conductor layer 25 may include a portion other than the multiple wiring line patterns 25$w$, the description of the embodiment may be made with the assumption that the conductor layer 25 does not include such a portion for the sake of convenience. For example, when the planar shape of the conductor layer 25 is referred to, this may refer to the planar shape of all the multiple wiring line patterns 25$w$ illustrated in FIG. 5.

The pad 43 is for mounting the power supply IC 15 thereon. In more detail, for example, one terminal 15$c$ (FIG. 1) and one pad 43 are bonded to each other by a conductive bonding material (not illustrated. For example, solder). Thus, for example, the same number of pads 43 as the number of terminals 15$c$ may be positioned on the first surface 5$a$ in an arrangement corresponding to the arrangement of the multiple terminals 15$c$. In FIG. 4, only one pad 43 is extracted for convenience, and the size of the pad 43 is exaggerated. However, the pad 43 may actually have the size as illustrated in FIG. 4. The specific position, planar shape, dimensions, and material of the pad 43 may be freely chosen. The pad 43 may be regarded as being part of the conductor layer 25 that overlaps the top surface of the insulating body 41 of the module substrate 5.

The pads 45 are for mounting the optical ICs 7. In more detail, for example, one terminal 7$c$ (FIG. 1) and one pad 45 are bonded to each other by a conductive bonding material (not illustrated. For example, solder). Thus, for example, the same number of pads 45 as the number of terminals 7$c$ may be positioned on the first surface 5$a$ in an arrangement corresponding to the arrangement of the multiple terminals 7$c$. In FIG. 4, only one pad 45 is extracted for convenience, and the size of the pad 45 is exaggerated. The relative position of the pad 45 relative to the optical IC 7 also does not match FIG. 1 and is for ease of illustration. However, the pad 45 may actually be at the position and/or have the size as illustrated in FIG. 4. The specific position, planar shape, dimensions, and material of the pad 45 may be freely chosen. The pad 45 may be regarded as being part of the conductor layer 25 that overlaps the top surface of the insulating body 41 of the module substrate 5.

As is understood from the above description of the pads 43 and 45, the via conductors 37 and 39 illustrated in FIGS. 4 and 5 are depicted in an exaggerated manner with respect to their size and/or the size of their arrangement area (of two or more via conductors), and their positions (relative to the power supply IC 15 or the optical ICs 7, for example) do not match those in FIG. 1. However, the via conductors 37 and 39 may actually have the size and/or arrangement as illustrated in FIGS. 4 and 5. The wiring line patterns 25$w$, for example, are depicted in an exaggerated manner with respect to their width at least at the end portions thereof (in other words, the portions connected to the via conductors 37 or 39), and their positions do not match those in FIG. 1. However, the wiring line patterns 25$w$ may actually have the width and/or be positioned as illustrated.

The insulating body 41 may be regarded as including multiple insulating layers 47 (FIG. 6). The via conductors 37 and via conductors 39 are conductors that penetrate through part of or the entirety of the thickness of the insulating body 41, as previously described, or from another perspective, are conductors that penetrate through one or more of the insulating layers 47. The portion of each via conductor 37 that penetrates through the corresponding insulating layer 47 may be regarded as a via conductor 37*a*. Similarly, the portion of each via conductor 39 that penetrates through the corresponding insulating layer 47 may be regarded as a via conductor 39*a*. The multiple conductor layers 25 are, basically, layer-shaped conductors parallel to both sides of the insulating body 41, and have different positions in the thickness direction of the insulating body 41 from each other. In the illustrated example, all (four) conductor layers 25 constituting the wiring lines 21 are positioned inside the insulating body 41 (between the insulating layers 47 from another perspective).

As illustrated in FIG. 6, the upper ends of the via conductors 37 are connected to the pads 43 Each via conductor 37 penetrates through the insulating body 41 to a depth reaching at least the bottommost conductor layer 25 (in this case, the fourth conductor layer 25D) among the multiple conductor layers 25 constituting the wiring lines 21, and is connected to all the conductor layers 25. Thus, the power supply IC 15 can supply power to all the conductor layers 25 constituting the wiring lines 21.

The upper end of each via conductors 39 is connected to the corresponding pad 45. Multiple via conductors 39 corresponding to different optical ICs 7 penetrate through the insulating body 41 to different depths (from another perspective, until they reach different conductor layers 25 from each other) and are connected to different numbers of conductor layers 25 from each other.

More precisely, in the example in FIG. 6, the first via conductors 39A, which is connected to the first optical IC 7A, is connected to the first conductor layer 25A. The second via conductor 39B, which is connected to the second optical IC 7B, is connected to the first conductor layer 25A and the second conductor layer 25B. The third via conductor 39C, which is connected to the third optical IC 7C, is connected to the first to third conductor layers 25A to 25C. The fourth via conductor 39D, which is connected to the fourth optical IC 7D, is connected to the first to fourth conductor layer 25A to 25D.

With this configuration, the structure of the module substrate 5 in which the longer the wiring lines 21 are, the greater the number of conductor layers 25 through which the wiring lines 21 extend is realized.

As is understood from the above description, one wiring line 21 may have two or more paths that are parallel (electrically parallel) to each other. For example, the second wiring line 21B has a path that extends through the first conductor layer 25A and a path that extends through the second conductor layer 25B. Therefore, when comparing the lengths of the wiring lines 21, for example, the shortest paths may be compared with each other. If the length of a particular wiring line 21 differs from position to position even if the same path is used, the length of wiring line 21 may be measured in a reasonable manner. For example, if the wiring line pattern 25*w* included in the conductor layer 25 is curved in plan view, the length will differ between the inside and outside of the pattern. In such a case, the length along the centerline may be taken as the length of the wiring line pattern 25*w*.

The pads 43 and 45 generally have a larger cross-sectional area with respect to the direction of current flow than the wiring lines 21, and have a smaller effect on the resistance value from the power supply IC 15 to the optical ICs 7. Even if there is an effect, the magnitude of this effect is generally the same among the multiple optical ICs 7. Therefore, in the present disclosure, descriptions may be given while ignoring the presence of the pads 43 and 45. For example, the total length of the shortest path along a particular wiring line 21 is exactly the length from the pad 43 to the pad 45, but may be referred to as "the length of the shortest path from the power supply IC 15 to the optical IC 7". If the effect of the pads 43 and/or pads 45 on the differences in resistance values from the power supply IC 15 to the multiple optical ICs 7 is significant, the pads 43 and/or 45 may be regarded as being part of wiring lines 21. In other words, the length of the pad 43 and/or pad 45 may be included in the "shortest path length from the power supply IC 15 to the optical IC 7" above. The description in this paragraph applies not only to pads for surface mounting, but also to lands for through-hole mounting.

The number of via conductors 37 may be freely chosen. In the illustrated example, two via conductors 37 are illustrated, but this is merely an example. For example, the number of via conductors 37 may be one or three or more. The same applies to the number of via conductors 39 corresponding to each optical IC 7. The relationship between the number of via conductors 37 and the number of via conductors 39 corresponding to each optical IC 7 may also be freely chosen.

(3.2. Another Example of Wiring Lines)

In this embodiment, various specific configurations are possible in which the longer the wiring lines 21 are, the greater the number of conductor layers 25 through which the wiring lines 21 extend, and the configurations in FIGS. 4 to 6 may be modified as appropriate.

For example, in the illustrated example, each via conductor 37 is configured such that the via conductor 37 can be regarded as a single conductor penetrating up to the fourth conductor layer 25D from the first surface 5A. Although not specifically illustrated, unlike in the illustrated example, a via conductor 37*a* that penetrates through the insulating body 41 from the first surface 5*a* to the first conductor layer 25A and a via conductor 37*a* that penetrates through the insulating body 41 from the first conductor layer 25A to the second conductor layer 25B may be separated from each other along the xy plane. This also applies to via conductors between the other conductor layers 25. The same applies to the via conductors 39 that connect the optical ICs 7 to two or more conductor layers 25.

In connection to the above, the number of insulating layers 47 through which a via conductor (for example, corresponding to the via conductor 37), which can be viewed as a single conductor, penetrates may be any number. For example, instead of the via conductor 37, a via conductor 37*a* that penetrates through one insulating layer 47 from the first surface 5*a* to the first conductor layer 25A and one via conductor that penetrates through three insulating layers 47 from the first conductor layer 25A to the fourth conductor layer 25D (three stacked via conductors 37*a*) may be provided. The via conductor 37 has been taken as an example, but this also applies to the via conductor 39.

The number of via conductors 37*a* may differ between the multiple insulating layers 47. For example, there may be two via conductors 37*a* that penetrate through one insulating layer 47 from the first surface 5*a* to the first conductor layer 25A, and there may be one or three or more via conductors 37*a* that penetrate through one insulating layer 47 from the first conductor layer 25A to the second conductor layer 25B. The via conductors 37*a* have been taken as an example, but this also applies to the via conductors 39*a*.

In the example in FIG. 6, a wiring line 21 that extends through two or more conductor layers 25 extends through all the conductor layers 25 through which another wiring line 21 that extend through a smaller number of conductor layers 25 than that wiring line 21 extends. For example, the fourth wiring line 21D extends through all of the first to third conductor layers 25A to 25C through which the third wiring line 21C extends. Unlike in the illustrated example, the former wiring line 21 (fourth wiring line 21D) does not need to extend through at least one of the conductor layers 25 through which the latter wiring line 21 (third wiring line 21C) extends.

Figure 9:
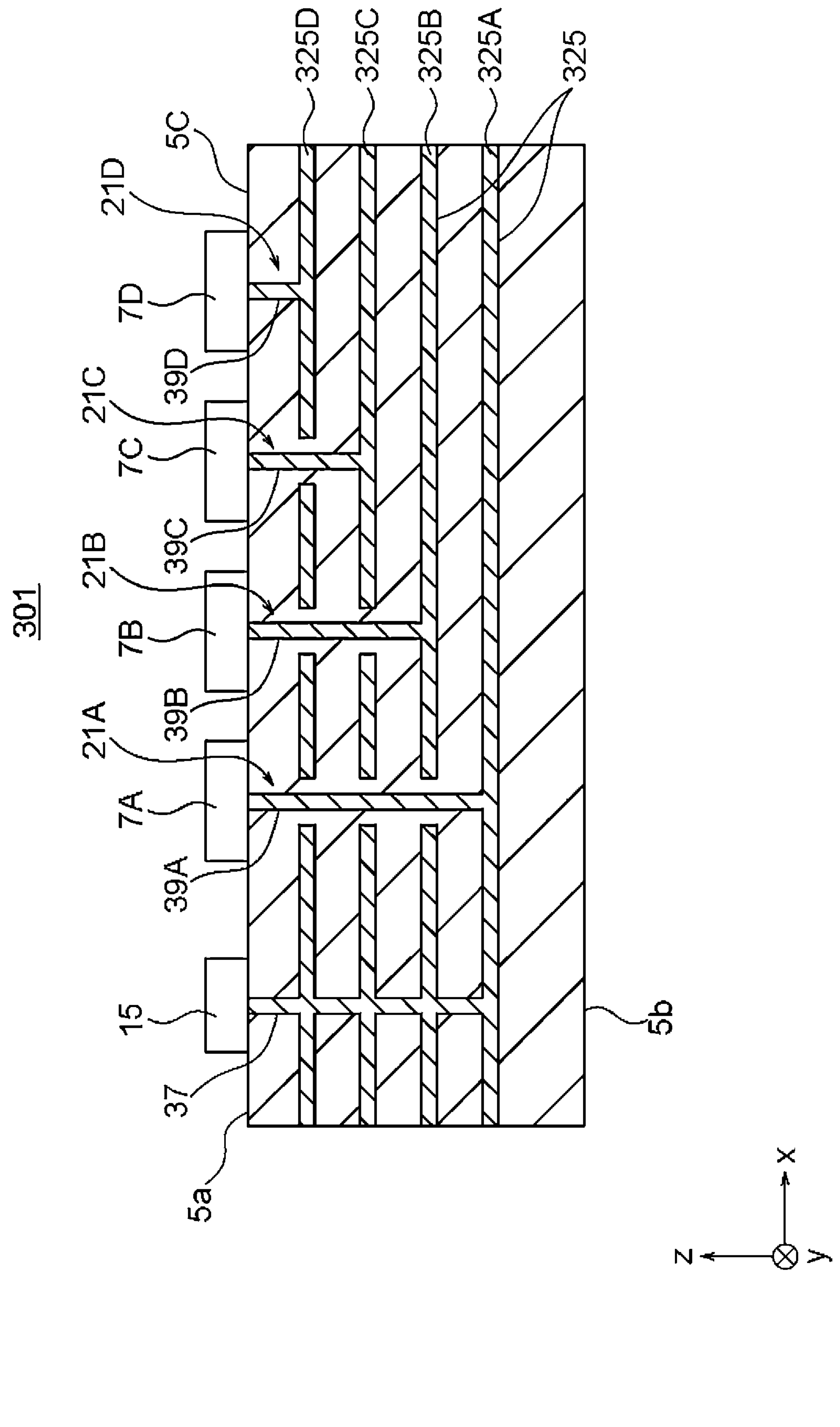
FIG. 9 is a sectional view illustrating a module substrate of an optical module according to a Third Embodiment.
Figure 10A:
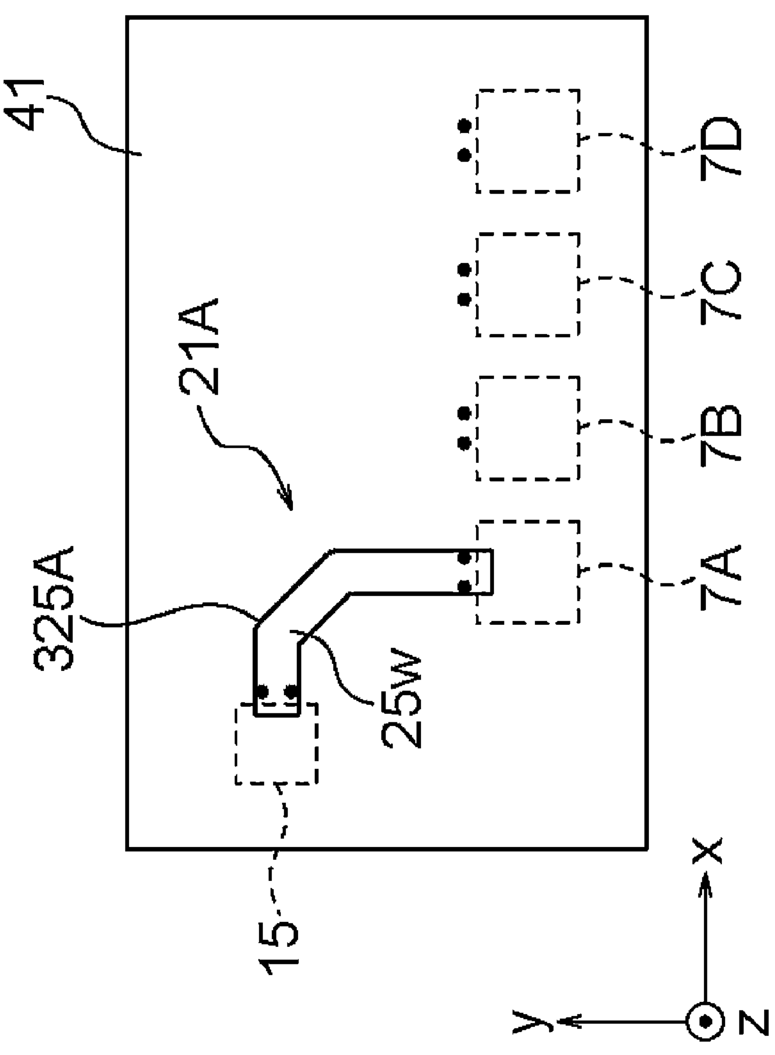
FIG. 10A is a plan view illustrating the shape of a first conductor layer of the module substrate in FIG. 9.
Figure 10B:
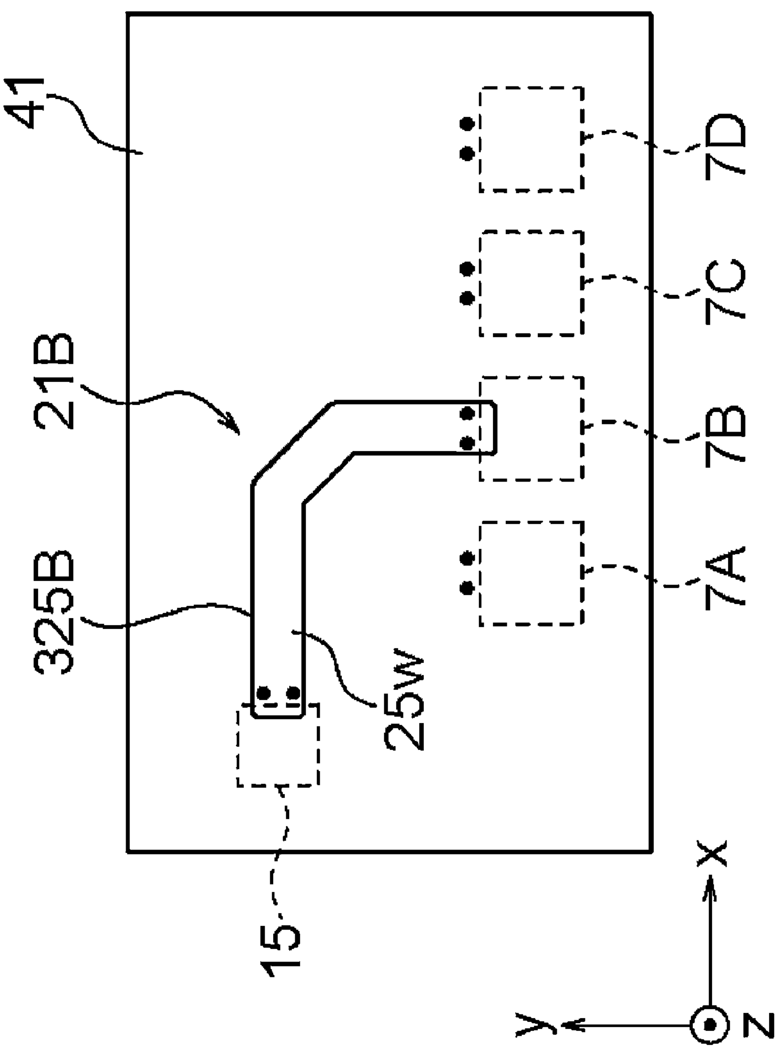
FIG. 10B is a plan view illustrating the shape of a second conductor layer of the module substrate in FIG. 9.
Figure 10C:
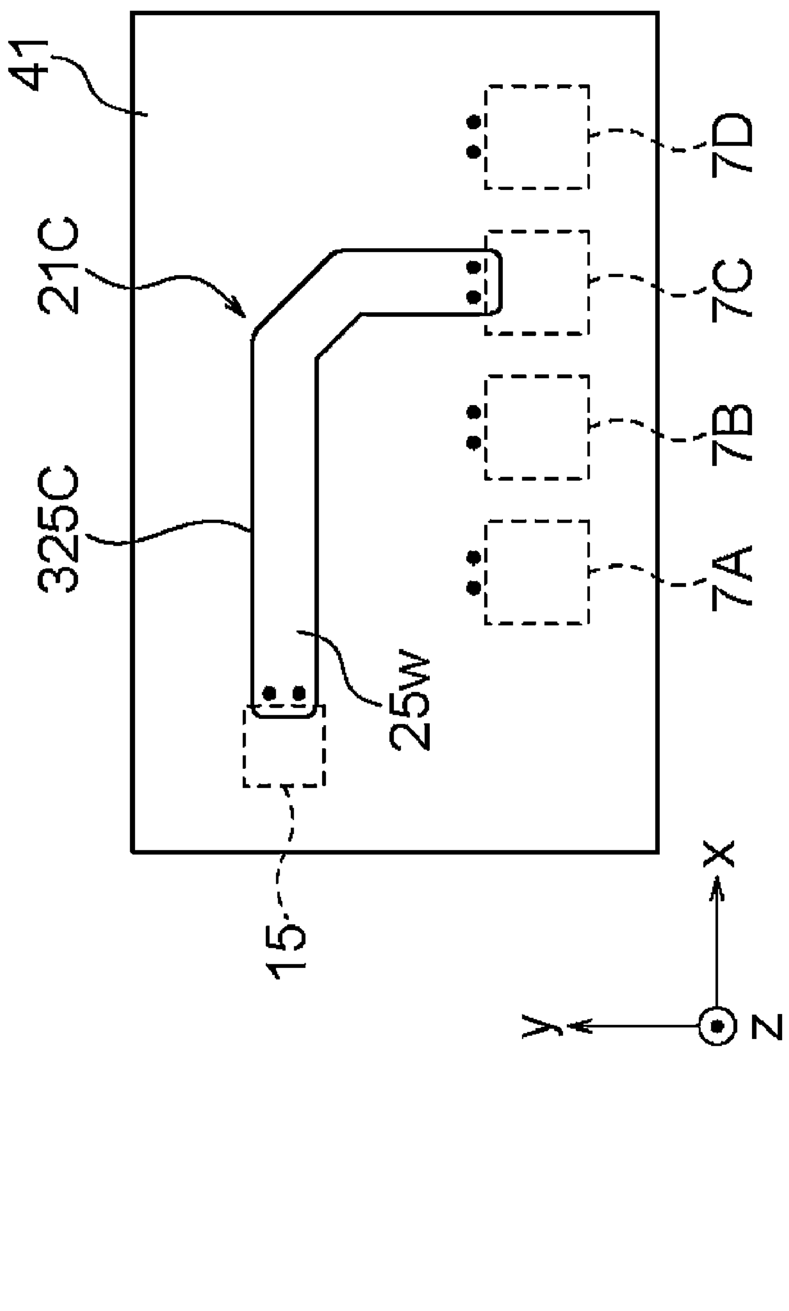
FIG. 10C is a plan view illustrating the shape of a third conductor layer of the module substrate in FIG. 9.
Figure 10D:
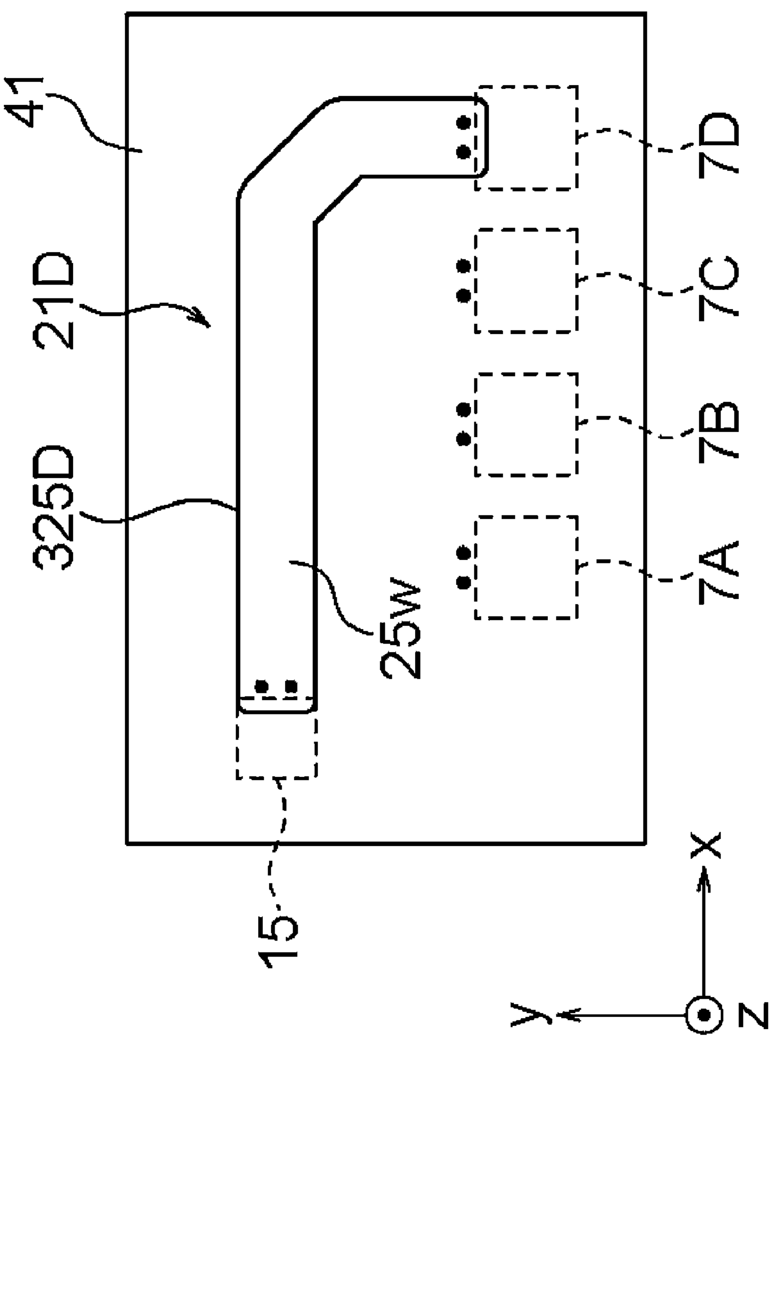
FIG. 10D is a plan view illustrating the shape of a fourth conductor layer of the module substrate in FIG. 9.

For example, a via conductor 39 (for example, the fourth via conductor 39D) can be made to not contact any number of the conductor layers 25 (at least one of the first to third conductor layers 25A to 25C) between the first surface 5A and the lowermost conductor layer 25 (fourth conductor layer 25D) to which that via conductor 39 is itself connected (see FIG. 9, although the intent is different from this embodiment). Thus, a configuration may be realized in which a wiring line 21 that extends through two or more conductor layers 25 does not extend through all the conductor layers 25 that other wiring lines 21, which extend through a smaller number of conductor layers 25 than itself, extend.

However, in this case, in order to maintain a configuration in which the longer a wiring line 21 is, the greater the number of conductor layers 25 through which the wiring line 21 extends (for example, a configuration in which the fourth wiring line 21D extends through a greater number of conductor layers 25 via than the third wiring line 21C), other conductor layers 25 than those illustrated in the figure (conductor layers 25 not illustrated in the figure that are included in the fourth wiring line 21D) are required. Therefore, the number of conductor layers 25 contained in the module substrate 5 is more easily reduced in the example in FIG. 6.

As already mentioned, a conductor layer 25 through which a wiring line 21 extends may be a conductor layer 25 located at the surface of the insulating body 41 (first surface 5*a* and/or second surface 5*b*) rather than the conductor layers 25 located inside the insulating body 41. That is, two or more conductor layers 25 utilized in two or more wiring lines 21 may consist of only the inner conductor layers 25 (illustrated example), only the surface conductor layers 25, or a combination of the inner conductor layers 25 and the surface conductor layers 25.

In the example in FIG. 6, all the conductor layers 25 are utilized to configure the wiring lines 21. Unlike in the illustrated example, the module substrate 5 may include conductor layers 25 that are not utilized to configure the wiring lines 21. Such conductor layers 25 may be used, for example, to configure wiring lines other than the wiring lines 21, to configure electronic elements (for example, resistors, inductors, or capacitors), or to configure a reference potential layer having a large area. FIG. 6 may be regarded as a diagram of the module substrate 5 that includes conductor layers 25 other than the conductor layers 25 constituting the wiring lines 21, with the other conductor layers 25 having been omitted from the diagram. For convenience, in the description of the embodiment, descriptions may be made with the assumption that the conductor layers 25 are conductor layers constituting the wiring lines 21.

The planar shape of conductor layers 25 in FIG. 5 is described as being that of any of the first to fourth conductor layers 25A to 25D. In other words, the first to fourth conductor layers 25A to 25D are described as having the same planar shape (and dimensions) and as overlapping each other in planar perspective view (more precisely, their outer edges coincide with each other). Unlike in the illustrated example, the planar shape, dimensions and/or positions of the first to fourth conductor layers 25A to 25D may differ from each other. For example, in the second conductor layer 25B, the wiring line pattern 25*w* corresponding to the first wiring line 21A (excluding the portion shared with other wiring line patterns 25*w*) is unnecessary, and therefore this wiring line pattern 25*w* may be omitted.

(3.3. Details of Wiring Lines)

The planar shape of each conductor layer 25 (portion thereof constituting the wiring line 21) may be any shape. In the example in FIG. 5, the conductor layer 25, which does not have a specific reference symbol attached thereto, includes a first portion that is connected to the power supply IC 15 by the via conductors 37 and multiple second portions that branch off and extend from the first portion. Each of the multiple second portions is individually connected to a corresponding one of the multiple optical ICs 7 via multiple via conductors 39. In other words, one wiring line pattern 25*w* connecting one power supply IC 15 to one optical IC 7 includes the first portion and the corresponding second portion. Multiple wiring line patterns 25*w* share the first portion. With this configuration, one type of power of the power supply IC 15 is distributed to multiple optical ICs 7.

From another perspective, in the example in FIG. 5, the conductor layer 25 includes four branch points corresponding to the four wiring line patterns 25*w*. In other words, although not denoted by a specific reference symbol, the conductor layer 25 includes a main line (portion extending parallel to the x direction) extending from the via conductors 37 and multiple branch lines branching from the main line one by one in a sequential manner from different positions in the direction in which the main line extends. However, at the final branch point (the branch point between third and fourth wiring lines 21C and 21D), the two branch lines diverge from each other. One wiring line pattern 25*w* connecting one power supply IC 15 to one optical IC 7 includes at least part of the main line and one branch line.

The planar shape of the conductor layer 25 illustrated in FIG. 5 is chosen based on the assumption that multiple optical ICs 7 are arranged in a row and that the power supply IC 15 is positioned outside (−x side) the range in which the multiple optical ICs 7 are positioned in the arrangement direction (x direction). However, as already mentioned, the arrangement of the power supply IC 15 and the optical ICs 7 may be freely chosen. For example, with respect to positions in the x direction, the power supply IC 15 may be positioned between the second and third optical ICs 7B and 7C, and/or the optical ICs 7 may be positioned on both the +y and −y sides with respect to the power supply IC 15. The planar shape of the conductor layer 25 may be modified as appropriate in accordance with the arrangement of the power supply IC 15 and the optical ICs 7. A planar shape different from the planar shape of the conductor layer 25 illustrated in FIG. 5 may be adopted for the arrangement of the power supply IC 15 and the optical ICs 7 illustrated in FIG. 5.

The conductor layer 25 can have various planar shapes other than the planar shape illustrated in FIG. 5. A number of examples are listed below. A shape in which two or more branch lines diverge from a main line at the same branch point in the middle of the main line. A shape in which three or more branch lines diverge from each other at a final branch point. A shape in which there is only one branch point. A shape in which further branching occurs from a branch line. A shape in which branch lines diverge from a main line on both sides (+y side and −y side relative to the main line extending in the x direction, for example). A shape in which the power supply IC 15 is connected to the midpoint of a main line (in other words, the main line (or a branch line) extends from the power supply IC 15 on both the +x side and the −x side). A shape in which the main line (first portion) and the branch lines (second portions) are not clearly distinct from each other. A shape that includes a line (non-branching line) extending from the power supply IC 15 through the positions of the via conductors 39 (for example, the first via conductors 39A) corresponding to one optical IC 7 to the positions of the via conductors (for example, the second via conductors 39B) corresponding to another optical IC 7.

The planar shape and dimensions of one wiring line pattern 25*w* may be freely chosen. In the illustrated example, the main line extends in a straight line and extends in the x direction (from another perspective, in the arrangement direction of the multiple optical ICs 7 and/or perpendicular to the fiber bundles 9). Each branch line extends in a direction perpendicular to the main line after branching off at an angle to the direction in which the main line extends (x direction). Each wiring line pattern 25*w* extends from one end to the other end with a substantially constant width. From another perspective, the width of the main line is generally the same as the width of the branch lines. However, this configuration is merely an example configuration and may be modified as appropriate.

For example, the main line may be inclined, curved, or bent with respect to the x direction. As previously mentioned, the positions of the via conductors 37 and 39 do not necessarily correspond to the positions in reality, and the details of the wiring line patterns 25*w* may differ from the shape illustrated in the figures. Each wiring line pattern 25*w* may include portions of different widths from each other. For example, the width of the main line (first portion) may be larger than the width of the branch lines (second portions).

The dimensions of the conductor layer 25 (wiring line patterns 25*w* from another perspective) in plan view and the thickness of the conductor layer 25 may also be freely chosen. These may be appropriately set so that the resistance values are suitable in accordance with the specifications of the power supply IC 15 and the optical ICs 7, etc. The material of the conductor layer 25 may be freely chosen, as has already been mentioned.

The configuration (for example, the shape, dimensions and/or material) of the multiple conductor layers 25 may be the same as or different from each other. In the latter case, the difference may be used to bring the resistance values of the multiple wiring lines 21 closer together. For example, by adjusting the width of the wiring line patterns 25*w*, the length of the wiring line patterns 25*w*, and/or the thickness of the conductor layers 25, the resistance values may be adjusted and, in turn, the resistance values of the multiple wiring lines 21 may be brought closer together.

The via conductors (37, 37*a*, 39 and 39*b*) may have various configurations. For example, the via conductors may be columnar (with no internal cavity) as in the illustrated example, or, unlike in the illustrated example, may be tubular (with an internal cavity). In the latter case, a vacuum or a gas may be present in the inside of the tube, or the inside of the tube may be filled with an insulating body. The entire columnar via conductor may consist of the same material, as previously described, or the inside and the outer peripheral surface may consist of different materials.

For example, the via conductors (37, 37*a*, 39, and 39*b*) may have or not have a transverse section (cross-section parallel to the xy plane) having a constant shape in the longitudinal direction (z direction). An example of the latter case is a tapered shape where the diameter is smaller on the +z side or the −z side. In addition, a shape in which two or more tapered shapes are stacked in the z direction, or a shape in which two or more shapes with different diameters from each other are stacked in the z direction may be adopted. For example, the via conductors may have or not have a flanged portion in the middle in the z direction. Such a flanged portion may be regarded as being a separate part from the via conductor.

The shape of the transverse section (cross-section parallel to the xy plane) of the via conductors (37, 37*a*, 39 and 39*b*) may be freely chosen. In the illustrated example, and generally speaking, the shape of the transverse section is circular. The length of the via conductors (from another perspective, the thickness of one or more insulating layers 47) and the diameter of the via conductors (maximum length or circle equivalent diameter) may also be freely chosen.

The configurations (for example, the shape, dimensions, and/or material) of the multiple via conductors (37, 37*a*, 39, and 39*b*) may be the same as or different from each other. In the latter case, similarly to the conductor layers 25, the differences may be used to bring the resistance values of the multiple wiring lines 21 closer together. For example, by adjusting the diameter of the via conductors, the resistance values may be adjusted, and consequently, the resistance values of the multiple wiring lines 21 may be brought closer together.

At the connection portions between the via conductors (37, 37*a*, 39, and 39*b*) and the conductor layers (conductor layers 25 and pads 43 and 45), the end portions (top end or bottom end) of the via conductors and the surfaces (bottom surface or top surface) of the conductor layers may be bonded together when viewed from the viewpoint of materials, etc., the via conductors may penetrate through the conductor layers, or such distinction might not be possible.

4. SUMMARY OF EMBODIMENT

As described above, the optical module 1 according to this embodiment includes the first optical IC 7A, the second optical IC 7B, a first power supply IC (power supply IC 15) and the module substrate 5 (5A). The first optical IC 7A and the second optical IC 7B perform photoelectric conversion. The power supply IC 15 supplies power to the first optical IC 7A and the second optical IC 7B. The first optical IC 7A, the second optical IC 7B, and the power supply IC 15 are positioned on the module substrate 5. The module substrate 5 include the first wiring line 21A and the second wiring line 21B. The first wiring line 21A connects the power supply IC 15 and the first optical IC 7A to each other. The second wiring line 21B connects the power supply IC 15 and the second optical IC 7B to each other. Here, the resistance value of the first wiring line 21A is R1, the resistance value of the second wiring line 21B is R2, the shortest path length from the power supply IC 15 to the first optical IC 7A within the first wiring line 21A is L1, and the shortest path length from the power supply IC 15 to the second optical IC 7B within the second wiring line 21B is L2. In this case, L2 is longer than L1 and $|R2-R1|$ is smaller than $(L2-L1)/L1\times R1$.

Therefore, for example, as already mentioned, variations in the voltage and/or current supplied to the multiple optical ICs 7 due to differences between the lengths of the wiring lines 21 can be reduced. As a result, for example, the likelihood of malfunctions occurring in any one of the optical ICs 7 can be reduced. In most cases, whether or not L2 is longer than L1 can be determined by visual inspection or by viewing an enlarged image, without having to accurately measure the length of each wiring line 21. The measurement of L1, L2, R1, and R2 is not necessarily required to determine whether |R2−R1| is smaller than (L2−L1)/L1×R1. For example, in this embodiment, whether or not |R2−R1| is smaller than (L2−L1)/L1×R1 can be determined based on the number of conductor layers 25 through which the wiring lines 21 extend without measuring L1, L2, R1, and R2, The module substrate 5A may include multiple conductor layers 25 that are at different positions from each other in the thickness direction of the module substrate 5A. The first wiring line 21A may extend through at least one of the multiple conductor layers 25 (one in the example in FIG. 6) while extending from the power supply IC 15 to the first optical IC 7A. While extending from the power supply IC 15 to the second optical IC 7B, the second wiring line 21B may extend in a parallel manner through a greater number of conductor layers 25 (two in the example in FIG. 6) than the number of conductor layers 25 that the first wiring line 21A extends through, out of the multiple conductor layers 25.

In this case, since the resistance value is adjusted by varying the number of conductor layers 25, the degree of freedom in designing each conductor layer 25 is higher than in, for example, a method in which the resistance value is adjusted only by changing the planar shape of the conductor layers 25 (such method may also be included in technologies relating to the present disclosure). In addition, since the conductor layers 25 may overlap each other in planar perspective view, there is also an advantage from the viewpoint of reducing the area of the module substrate 5A. In the above description, "parallel" does not refer to structurally parallel, but rather electrically parallel ("parallel" in series connections and parallel connections).

The multiple conductor layers 25 may include the first conductor layer 25A through which both the first wiring line 21A and the second wiring line 21B extend, and the second conductor layer 25B through which only the second wiring line 21B, out of the first and second wiring lines 21A and 21B, extends.

In this case, for example, as is understood from the previous description, the number of conductor layers 25 can be reduced compared to a method in which the numbers of conductor layers 25 through which the two wiring lines 21 extend are made different from each other by using completely different conductor layers 25 for the first wiring line 21A and the second wiring line 21B (this method may also be included in the technologies relating to the present disclosure). This, in turn, is advantageous for reducing the thickness of the module substrate 5A.

The first conductor layer 25A may include a first pattern (wiring line pattern 25*w*) that constitutes the second wiring line 21B. The second conductor layer 25B may include a second pattern (different wiring line pattern 25*w* from the above) that constitutes the second wiring line 21B. In planar perspective view, at least part of the first pattern and at least part of the second pattern may overlap each other. For example, as previously mentioned, the planar shape of the conductor layer 25 illustrated in FIG. 5 may be the planar shape of first conductor layer 25A and the planar shape of the second conductor layer 25B, and the first pattern and the second pattern may be identical.

In this case, for example, both the first pattern and the second pattern can essentially be the shortest path from the power supply IC 15 to the second optical IC 7B in planar perspective view. This allows, for example, the resistance value of the second wiring line 21B to be efficiently lowered. In addition, the effect of reducing the area of the module substrate 5A described above is easily obtained.

The optical module 1 may include first and second fiber bundles (9), first and second optical connectors (11), and at least one control IC 13. The first or second fiber bundle (9) may each include multiple optical fibers 23 extending in parallel with each other and the first or second fiber bundle (9) may extend out from the first optical IC 7A or the second optical IC 7B. The first or second optical connector (11) may be positioned at the end portion of the first or second fiber bundle (9) on the opposite side from the first optical IC 7A or the second optical IC 7B, and may also be connected to an external optical element so as to enable transmission of optical signals. The at least one control IC 13 may be positioned on the module substrate 5 and may control at least one of the first optical IC 7A and the second optical IC 7B.

In this case, for example, the optical IC 7, the power supply IC 15, and the control IC 13 are positioned on a single module substrate 5, and therefore the multi-channel optical module 1 is reduced in size. In this configuration, the power supply IC 15 is shared by multiple optical ICs 7, and this facilitates a further reduction in size. Variations in the drop amount, which is one disadvantage of having the power supply IC 15 shared by multiple optical ICs 7, is reduced as has already been mentioned.

Second Embodiment

Figure 7:
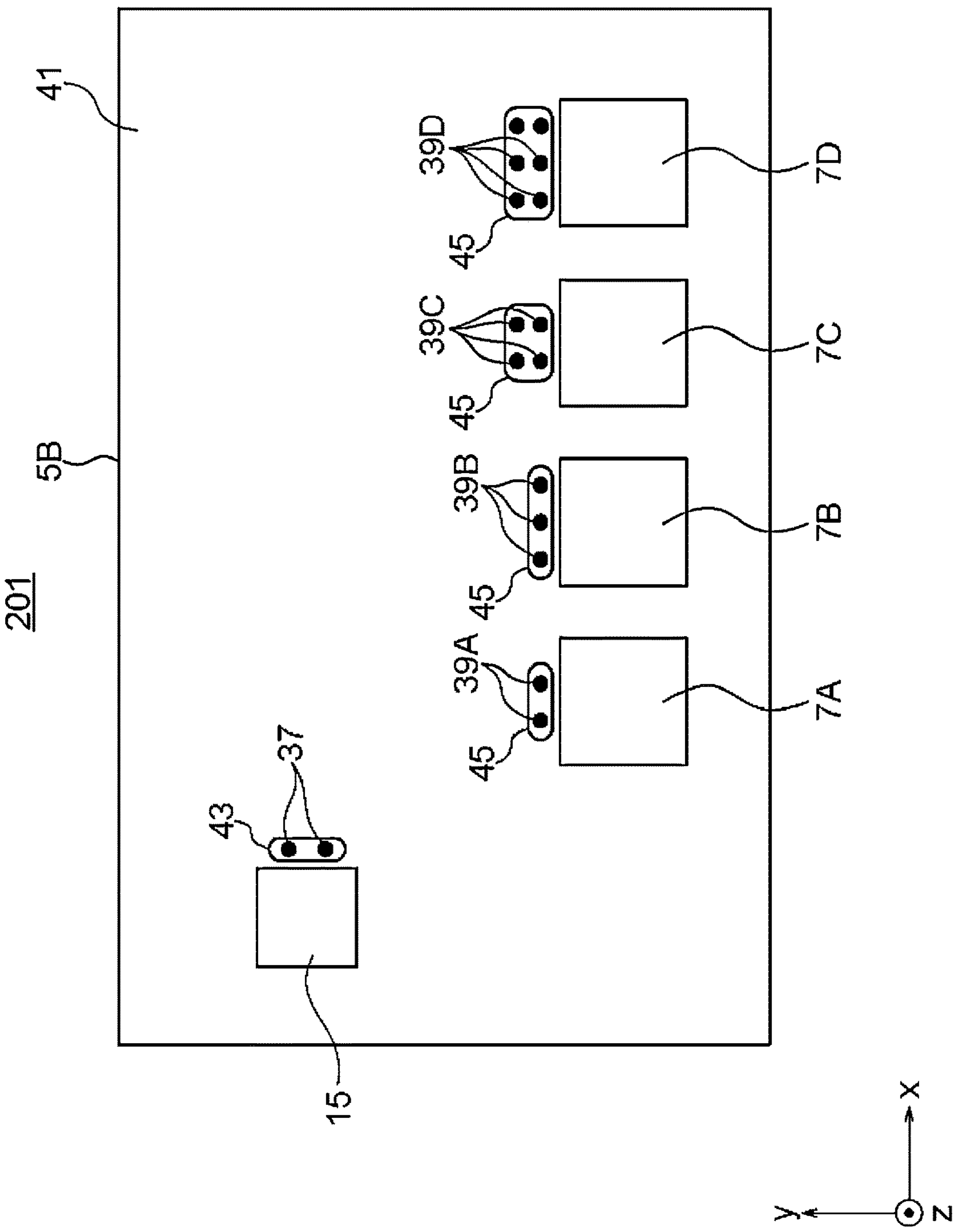
FIG. 7 is a plan view illustrating a module substrate of an optical module according to a Second Embodiment.
Figure 8:
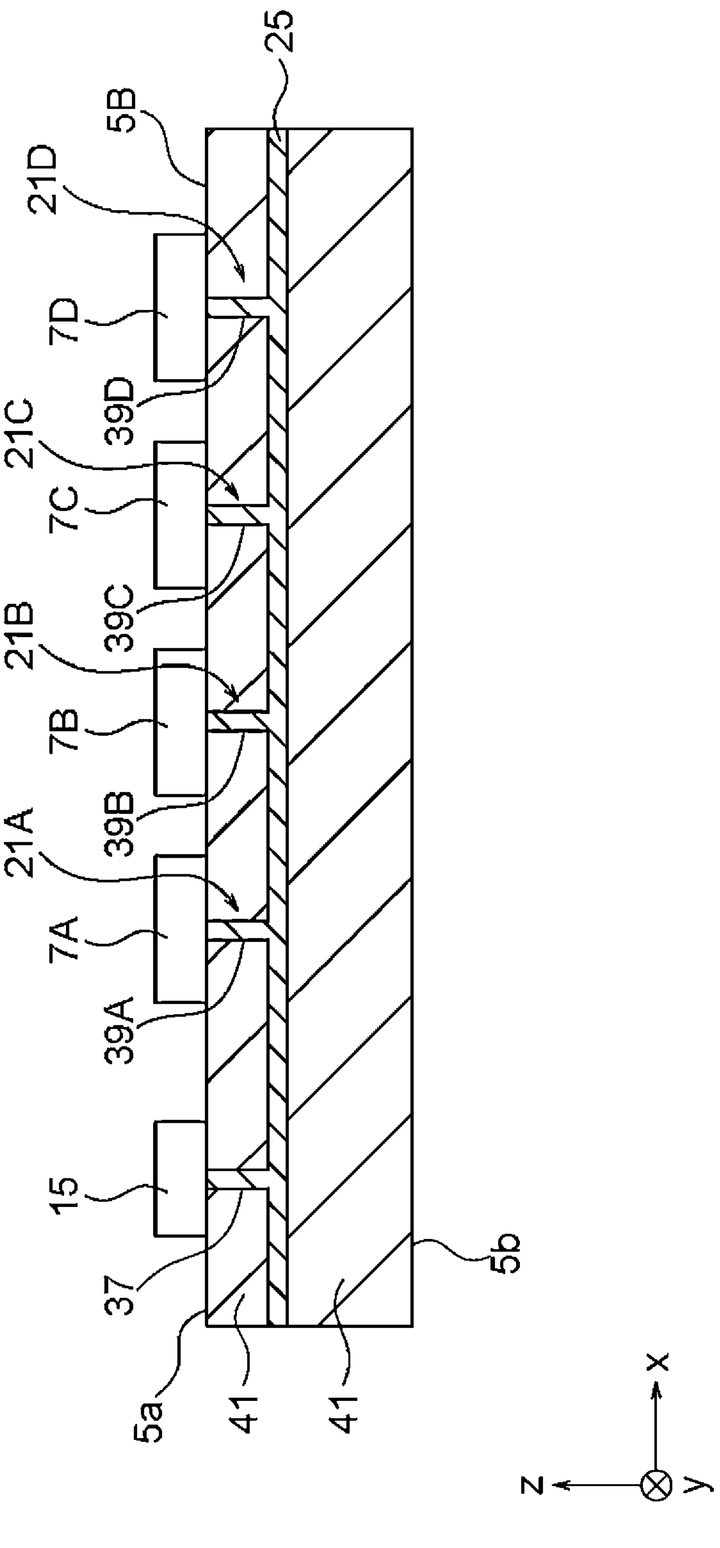
FIG. 8 is a diagram illustrating an example of the cross-sectional structure of the module substrate in FIG. 7.

FIG. 7 is a plan view illustrating the module substrate 5 (module substrate 5B as an example) of an optical module 201 according to a Second Embodiment. This figure corresponds to FIG. 4 of the First Embodiment. In addition, FIG. 8 is a diagram illustrating an example of the cross-sectional structure of the module substrate 5B. This figure corresponds to FIG. 6 of the First Embodiment.

As illustrated in FIG. 8, the module substrate 5B includes only one conductor layer 25 as the conductor layer constituting the multiple wiring lines 21. Similarly to as in the First Embodiment, the conductor layer 25 is connected to the power supply IC 15 by the via conductors 37 and is connected to the optical ICs 7 by the via conductors 39. Note that FIG. 5, which is referred to in the description of the First Embodiment, may be regarded as a plan view illustrating the conductor layer 25 of the module substrate 5B.

In this embodiment, as illustrated in FIG. 7, the longer the wiring lines 21 are, the greater the number of via conductors 39 connecting the conductor layer 25 to the optical ICs 7. As a result, the longer wiring lines 21 have a larger cross-sectional area, and a lower resistance value in at least in part of their length. As a result, the resistance values of the multiple wiring lines 21 are brought closer together.

The multiple via conductors 39 (or via conductors 39*a*) may, for example, have the same diameter (cross-sectional area) as each other. The cross-sectional area of the portion of each wiring line 21 constituted by the via conductors 39 may be adjusted by changing only the number of via conductors 39. However, the diameters of the multiple via conductors 39 may be different from each other for via conductors 39 corresponding to different optical ICs 7 and/or for via conductors 39 corresponding to the same optical IC 7. The cross-sectional area (in other words, resistance value) of the wiring lines 21 may be adjusted by changing both the number and diameter of the via conductors 39. The diameter of the via conductors 39 is taken as an example, but this also applies to other conditions (shape, dimensions, and material, etc.).

FIG. 8 illustrates an example configuration of the cross-sectional structure of the module substrate 5B in which there is only one conductor layer 25 constituting the multiple wiring lines 21. However, the cross-sectional structure of the module substrate 5B may be the same as or similar to that of the First Embodiment illustrated in FIG. 6. In other words, the resistance value of each wiring line 21 may be adjusted by varying both the number of conductor layers 25 passed through and the number of via conductors 39.

More specifically, for example, all of the first to fourth wiring lines 21A to 21D may differ from each other in terms of the number of conductor layers 25 through which the wiring lines extend and the number of via conductors 39. In addition, for example, the method used to adjust the resistance values may differ among the wiring lines 21, such as, for example, some wiring lines 21 extending through the same number of conductor layers 25 as each other but having different numbers of via conductors 39 from each other, and some other wiring lines 21 extending through different numbers of conductor layers 25 from each other but having the same number of via conductors 39 as each other. The number of methods used to adjust the resistance values may differ among the wiring lines 21, for example, for some of the wiring lines 21, only one out of the number of conductor layers 25 passed through and the number of via conductors 39 differ from each other, whereas for some other wiring lines 21, both the number of conductor layers 25 passed through and the number of via conductors 39 differ from each other.

In the above Second Embodiment as well, for example, L2 is longer than L1 and |R2−R1| is smaller than (L2−L1)/L1×R1. Therefore, substantially the same effects as in the First Embodiment are achieved. For example, the likelihood of malfunctions occurring in any one of the optical ICs 7 can be reduced.

In this embodiment, the module substrate 5 (module substrate 5B as one example) may include, thereinside, one or more conductor layers 25 that are electrically connected to the power supply IC 15. The first wiring line 21A may include at least one first via conductor 39A electrically connecting at least one of the one or more conductor layers 25 to the first optical IC 7A. The second wiring line 21B may include at least one second via conductor 39B electrically connecting at least one of the one or more conductor layers 25 (may be the same conductor layer 25 to which the first via conductor 39A is connected or may be a different conductor layer 25) to the second optical IC 7B. The number of second via conductors 39B (via conductors 39 of the relatively longer wiring line 21) may be greater than the number of first via conductors 39A.

In this case, a simple method of adjusting the number of via conductors 39 can be used to bring the resistance values of the wiring lines 21 of different lengths closer together.

Third Embodiment

FIG. 9 is a sectional view illustrating the module substrate 5 (module substrate 5C as an example) of an optical module 301 according to a Third Embodiment. This figure corresponds to FIG. 6 of the First Embodiment.

As illustrated in this figure, the multiple wiring lines 21 (first to fourth wiring lines 21A to 21D) extend through conductor layers 325 (corresponding to the conductor layers 25 in the First Embodiment) that are different from each other. Specifically, the first wiring line 21A extends through a first conductor layer 325A. The second wiring line 21B extends through a second conductor layer 325B. The third wiring line 21C extends through a third conductor layer 325C. The fourth wiring line 21D extends through a fourth conductor layer 325D. This configuration is realized, for example, by the via conductors 39 of each wiring line 21 being connected only to the conductor layer 325 corresponding to those via conductors 39. The via conductors 39 are not connected to the conductor layers 325 between the first surface 5*a* and the conductor layer 325 corresponding those via conductor 39 as a result of passing through a not-arranged region (e.g., an opening or cutout) in the conductor layers 325 that do not correspond to those via conductors 39.

FIGS. 10A to 10D are plan views illustrating the shapes of the first to fourth conductor layers 325A to 325D. These figures corresponds to FIG. 5 of the First Embodiment.

As illustrated in these figures, in this embodiment, the longer the wiring line 21 is, the wider the conductor layer 325 (wiring line pattern 25*w*) is. As a result, the longer wiring lines 21 have a larger cross-sectional area, and consequently, a lower resistance value in at least in part of their length. As a result, the resistance values of the multiple wiring lines 21 are brought closer together. Similarly to as in the First Embodiment, the planar shape and dimensions of the wiring line patterns 25*w* may be freely chosen. For example, each wiring line pattern 25*w* may extend from one end to the other with a generally constant width (illustrated example), or may include portions having different widths from each other. In the latter case, wiring lines 21 having different lengths from each other may include portions having identical widths. In the present disclosure, unless otherwise noted, when the widths of the wiring line patterns 25*w* are compared, each width may be, for example, the average width over the entire length of the wiring line pattern 25*w*.

In the illustrated example, the shapes of the wiring line patterns 25*w* follow the shape of the wiring line patterns 25*w* in FIG. 5. In other words, the planar shape of each conductor layer 325 is shaped like a portion corresponding to one wiring line pattern 25*w* extracted from the planar shape of the conductor layer 25 in FIG. 5. However, the degree of freedom of the shape of the wiring line patterns 25*w* in this embodiment is higher than the degree of freedom of the shape of the wiring line patterns 25*w* in the First Embodiment. For example, in the First Embodiment, one conductor layer 25 includes a main line extending from the power supply IC 15 and multiple branch lines that branch off from the main line in a sequential manner, as previously described. The multiple branch lines are, of course, positioned in different areas from each other. On the other hand, in this embodiment, the wiring line patterns 25*w* corresponding to the different optical ICs 7 (portions corresponding to the branch lines in the First Embodiment, for example) are constituted by different conductor layers 25, and therefore may overlap each other in planar perspective view. Therefore, in this embodiment, the wiring line patterns 25*w* do not need to conform to those in FIG. 5.

In the illustrated example, the longer (more easily lengthened) wiring lines 21 extend through the conductor layers 325 on the upper side (the side of the surface on which the power supply IC 15 and the optical ICs 7 are mounted). As a result, for example, the longer the wiring lines 21 are, the shorter the lengths of the via conductors 37 and 39 in the z direction, and the more easily the resistance values of the multiple wiring lines 21 are brought closer together. However, in the low-profile module substrate 5, the lengths of the via conductors 37 and 39 tend to be shorter than the lengths of the wiring line patterns 25*w* in the xy-plane. Therefore, the relationship between the lengths of the wiring lines 21 (relative positions of the optical ICs 7 to the power supply IC 15 from another perspective) and the positions of the conductor layers 325 in the z-direction passed through may be the opposite of that in the illustrated example, in part or in the entirety.

The description of the Second Embodiment noted that the Second Embodiment may be combined with the First Embodiment. Similarly, the Second Embodiment may be combined with this embodiment. For example, the longer the wiring line 21 is, the greater the number of via conductors 39 that may be provided and the greater the width of the wiring line pattern 25*w* may be. In the description of this embodiment, basically, the concept using separate conductor layers 325 for each wiring line 21 is explained. However, the features inherent to this embodiment may be combined with the First Embodiment as appropriate. For example, the longer the wiring line 21 is, the greater the number of conductor layers 25 that the wiring line 21 may pass through and the greater the width of the wiring line pattern 25*w* may be. Furthermore, the Second Embodiment may be combined with such a combination. In these various combinations, the method used to adjust the resistance values may be the same or different between some wiring lines 21 and some other wiring lines 21. The number of methods used to adjust resistance values may differ between some wiring lines 21 and some other wiring lines 21.

In the above Third Embodiment as well, for example, L2 is longer than L1 and |R2−R1| is smaller than (L2−L1)/L1×R1. Therefore, substantially the same effects as in the First Embodiment are achieved. For example, the likelihood of malfunctions occurring in any one of the optical ICs 7 can be reduced.

The module substrate 5C may include the first conductor layer 325A and the second conductor layer 325B, which are at different positions in the thickness direction of the module substrate 5C from each other. The first wiring line 21A may extend through only the first conductor layer 325A, out of the first and second conductor layers 325A and 325B, while extending from the power supply IC 15 to the first optical IC 7A. The second wiring line 21B may extend through only the second conductor layer 325B, out of the first conductor layer 325A and the second conductor layer 325B, while extending from the power supply IC 15 to the second optical IC 7B. The width of the pattern (wiring line pattern 25*w*) constituting the second wiring line 21B of the second conductor layer 325B may be wider than the width of the pattern (wiring line pattern 25*w*) constituting the second wiring line of the first conductor layer 325A.

In this case, for example, as already mentioned, the wiring line pattern 25*w* of the first wiring line 21A and the wiring line pattern 25*w* of the second wiring line 21B are realized by different conductor layers 325, and this allows a higher degree of freedom in design (in other words, degree of freedom with respect to the width of the wiring line patterns 25*w*). The resistance value of the first wiring line 21A and the resistance value of the second wiring line 21B can be brought closer together by using the simple technique of adjusting the widths of the wiring line patterns 25W.

Fourth to Sixth Embodiments

In the first to Third Embodiments, a case in which there is one power supply IC 15 was taken as an example. In fourth to Sixth Embodiments, a case in which there are multiple power supply ICs 15 is taken as an example. The multiple power supply ICs 15 may, for example, supply different types of power from each other, as described in the First Embodiment, and each power supply IC 15 may supply power to two or more (for example, all) of the optical ICs 7.

The structure of the module substrate 5 in the first to Third Embodiments may be applied to the fourth to Sixth Embodiment as long as there are no contradictions and so on.

From another perspective, in the fourth to Sixth Embodiments, when focusing on a single power supply IC 15, the descriptions of the first to Third Embodiments may be applied.

Fourth Embodiment

Figure 11:
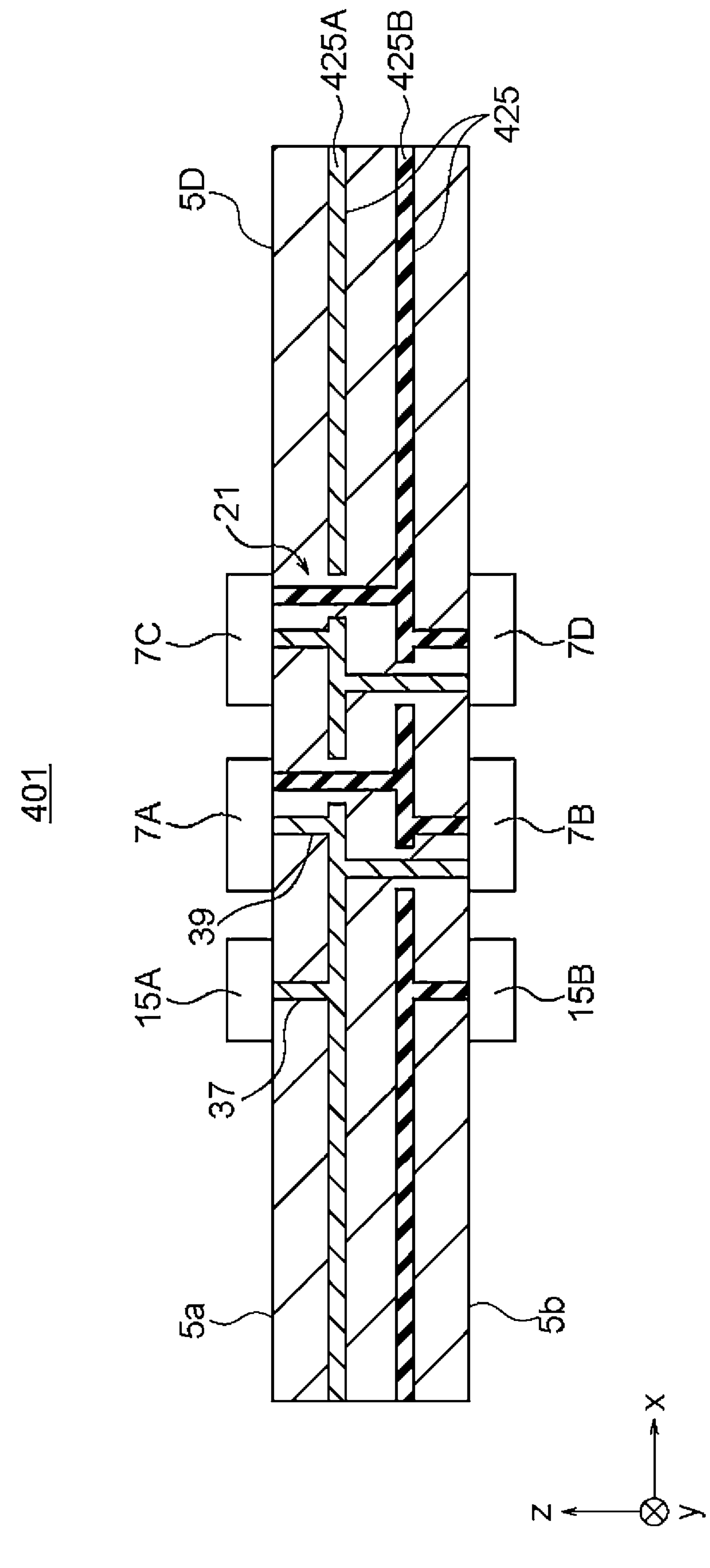
FIG. 11 is a sectional view illustrating the configuration of an optical module according to a Fourth Embodiment.

FIG. 11 is a sectional view illustrating the configuration of an optical module 401 according to a Fourth Embodiment. This figure corresponds to FIG. 6 of the First Embodiment.

In short, the optical module 401 has a configuration in which multiple power supply ICs 15 and multiple optical ICs 7 are disposed in a vertically symmetrical manner. That is, in planar perspective view, there is at least one set of two power supply ICs 15 that overlap each other (one set in the illustrated example) and at least one set of two optical ICs 7 that overlap each other (two sets in the illustrated example). This allows the lengths of the multiple wiring lines 21 to be brought closer to each other, and this in turn, allows the resistance values of the multiple wiring lines 21 to be brought closer to each other more easily.

For example, in the illustrated example, the first optical IC 7A and the second optical IC 7B are disposed in a vertically symmetrical manner with respect to each other, and this facilitates bringing the length of the wiring line 21 from a first power supply IC 15A to the first optical IC 7A and the length of the wiring line 21 from the first power supply IC 15A to the second optical IC 7B closer to each other. This reduces variations in the same type of power supplied to the first optical IC 7A and the second optical IC 7B, for example. The difference in resistance value due to a difference in length between the two wiring lines may be reduced by applying at least one of the first to Third Embodiments. Similarly, a difference in resistance value due to a difference in length between two or more optical ICs 7 (for example, first optical IC 7A and third optical IC 7C) mounted on the same mounting surface (first surface 5*a* or second surface 5*b*) may also be reduced by applying at least one of the first to Third Embodiments.

For example, in the illustrated example, the first power supply IC 15A and second power supply IC 15B are disposed in a vertically symmetrical manner, and this facilitates bringing the lengths of the wiring lines 21 from these power supply ICs 15 to each optical IC 7 closer to each other. For example, bringing the length of the wiring line 21 from the first power supply IC 15A to the first optical IC 7A and the length of the wiring line 21 from the second power supply IC 15B to the first optical IC 7A closer together is facilitated. In this way, for example, in each optical IC 7, variations in the potential difference between the potential supplied from the first power supply IC 15A and the potential supplied from the second power supply IC 15B tend to be smaller. As a result, for example, the operation of optical ICs 7 is stabilized when a potential difference is utilized in the optical ICs 7.

In the illustrated example, for example, the first power supply IC 15A and the second power supply IC 15B are disposed in a vertically symmetrical manner, and the first optical IC 7A and the second optical IC 7B are disposed in a vertically symmetrical manner, and therefore both the above effects are realized. For example, part of the wiring line 21 from the first power supply IC 15A to the first optical IC 7A (or the second optical IC 7B) and part of the wiring line 21 from the second power supply IC 15B to the second optical IC 7B (or the first optical IC 7A) can be easily made to have a vertically symmetrical configuration. As a result, for example, the resistance values of the wiring lines 21 for which both the source and destination of power are different from each other can be predicted in the same way, and thus the design burden is reduced. For example, there is an advantage in reducing the area of a module substrate 5D by disposing both the power supply ICs 15 and the optical ICs 7 in a vertically symmetrical manner.

The total number of the two or more power supply ICs 15 that supply power to the two or more optical ICs 7 in a common manner is not limited to two (illustrated example) and may be an odd number or an even number. Similarly, the number of the two or more optical ICs 7 supplied with power in a common manner as described above is not limited to four (illustrated example) and may be an odd number or an even number. For example, the above relationship may be hold true when focusing on at least two power supply ICs 15 and at least two optical ICs 7. Of course, an even number of four or more power supply ICs 15 (each set of two or more power supply ICs 15) may be disposed in a vertically symmetrical manner and/or an even number of four or more optical ICs 7 (each set of two or more optical ICs 7) may be disposed in a vertically symmetrical manner. From another perspective, the total number (even number) or an even number that is one smaller than the total number (odd number) of power supply ICs 15 may be disposed in a vertically symmetrical manner and/or the total number (even number) or an even number that is one smaller than total number (odd number) of optical ICs 7 may be disposed in a vertically symmetrical manner. The description given in this paragraph may be applied to the Fifth Embodiment (FIG. 12), described below, by replacing the words "vertically symmetrical" with the words "horizontally symmetrical".

When two power supply ICs 15 are said to be disposed in a vertically symmetrical manner, the two power supply ICs 15 may overlap perfectly in planar perspective view (may coincide except for some allowable deviation), or may be misaligned to some extent. If a misalignment exists, whether or not they are disposed in a vertically symmetrical manner may be determined in a reasonable manner. For example, the following cases may be determined to be disposed in a vertically symmetrical manner. In planar perspective view, the overlapping area of the two power supply ICs 15 is greater than or equal to ½ or ⅔ of the area of each power supply IC 15 (or the smaller one if the two power supply ICs 15 differ from each other), and neither of the power supply ICs 15 overlaps another power supply IC 15. And/or the distance between the centers of the two power supply ICs 15 in planar perspective view is less than or equal to ½ or ⅓ of the minimum width of each power supply IC 15 (or the smaller one if the two power supply ICs 15 differ from each other), and neither of the power supply ICs 15 overlaps another power supply IC 15. The centers may be, for example, the geometric centers (applies similarly elsewhere below). The area and center may be based on the sealing portion 15*b* or the package 15*a* (applies similarly elsewhere below). The power supply ICs 15 were taken as an example, but this similarly applies to the optical ICs 7.

To be sure, as is understood from the description of the First Embodiment, the positions in the y direction of multiple ICs mounted on the same surface (for example, the first power supply IC 15A, the first optical IC 7A, and the third optical IC 7C mounted on the first surface 5A) may be freely chosen. For example, the position of the first optical IC 7A in the y direction and the position of the second optical IC 7B in the y direction may be the same as or different from each other. This similarly applies to the Fifth Embodiment (FIG. 12) described below.

In the illustrated example, the wiring line 21 connected to the first power supply IC 15A and the wiring line 21 connected to the second power supply IC 15B extend through different conductor layers 425 (first conductor layer 425A and second conductor layer 425B). Furthermore, in the illustrated example, the positions of the two conductor layers 425 in the z direction are vertically symmetrical, for example, with respect to the center of the module substrate 5D in the thickness direction. In this case, since the lengths of the via conductors 37 and 39 corresponding to the first power supply IC 15A and the lengths of the via conductors 37 and 39 corresponding to the second power supply IC 15B are identical, the lengths of the wiring lines 21 are more easily brought close to each other.

However, in the low-profile module substrate 5, the lengths of the via conductors 37 and 39 (in the z direction) tend to be shorter than the length of the wiring line patterns 25*w*. Therefore, the positions of the two conductor layers 425 in the depth direction may be different from each other. Unlike in the illustrated example, a pattern connected to the first power supply IC 15A and a pattern connected to the second power supply IC 15B may be included within one conductor layer 425 in such a manner as to not short-circuit each other. For example, one pattern may be positioned on the +y side and the other pattern may be positioned on the −y side with respect to the line of multiple optical ICs 7. In this case, portions of the two patterns may be at positions and have shapes and dimensions having line symmetry with each other, for example.

As already mentioned, the positions, shapes, and dimensions of portions of the two conductor layers 425 may be identical to each other or different from each other in planar perspective view. In the former case, the area of the portions may be, for example, greater than or equal to ½ or ⅔ of the area of each conductor layer 425 (or the smaller one if the areas of the two layers are different). As mentioned in the description of the First Embodiment, the thickness and material of the two conductor layers 425 may be the same as or different from each other. The planar shape of the conductor layers 425 may be any shape, but for example, may be a shape obtained by omitting two wiring line patterns 25*w* (the branch lines thereof) from the conductor layer 25 illustrated in FIG. 5.

As described above, in addition to the first power supply IC 15A, the optical module 401 may include the second power supply IC 15B that supplies power to the first optical IC 7A and the second optical IC 7B. The module substrate 5D may have the first surface 5*a* and the second surface 5*b* on the opposite side from the first surface 5*a*. The first power supply IC 15A and the first optical IC 7A may be positioned on the first surface 5A. The second power supply IC 15B and the second optical IC 7B may be positioned on the second surface 5*b*.

In this case, the lengths of the multiple wiring lines 21 can be brought closer together, for example, by configuring the multiple wiring lines 21 to have symmetrical paths, as described previously. Since the multiple power supply ICs 15 and the multiple optical ICs 7 are distributed across the first surface 5*a* and second surface 5*b*, there is an advantage in terms of reducing the area of the module substrate 5D.

In planar perspective view, the first power supply IC 15A and second power supply IC 15B may overlap each other. In addition, the first optical IC 7A and the second optical IC 7B may overlap each other. In other words, the positional relationship between the power supply ICs 15 and the optical ICs 7 may be vertically symmetrical or close to vertically symmetrical.

In this case, for example, the multiple wiring lines 21 are easily configured so as to be symmetrical with each other, as previously described. In turn, the lengths of multiple wiring lines 21 are easily brought closer together.

Fifth Embodiment

Figure 12:
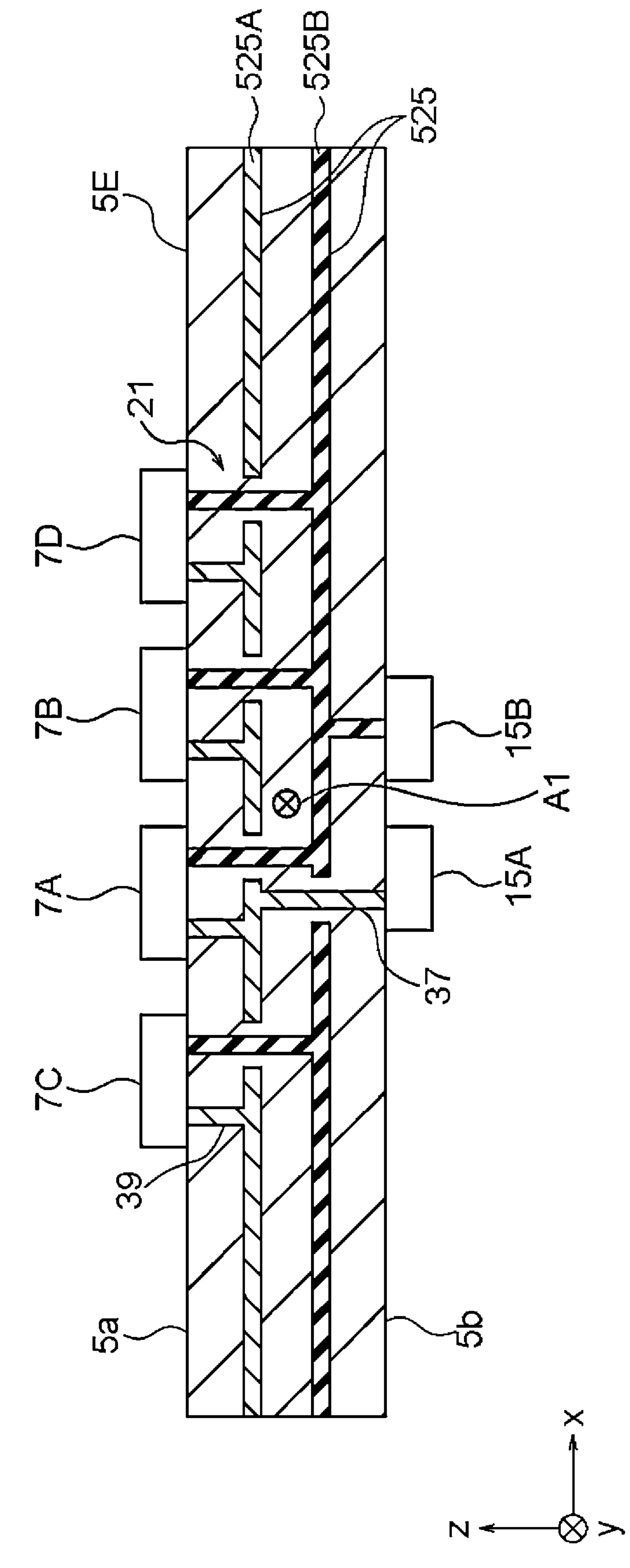
FIG. 12 is a sectional view illustrating the configuration of an optical module according to a Fifth Embodiment.

FIG. 12 is a sectional view illustrating the configuration of an optical module 501 according to a Fifth Embodiment. This figure corresponds to FIG. 6 of the First Embodiment.

In short, the optical module 501 has a configuration in which multiple power supply ICs 15 and multiple optical ICs 7 are disposed in a horizontally symmetrical manner. That is, there is at least one set (one in the illustrated example) of two power supply ICs 15 that are horizontally symmetrical to each other and at least one set (two in the illustrated example) of two optical ICs 7 that are horizontally symmetrical to each other. More precisely, in planar perspective view, each set (two) of power supply ICs 15 is disposed with line symmetry about an axis of symmetry A1 parallel to a prescribed direction (y direction in the illustrated example). Similarly, each set (two) of optical ICs 7 is disposed with line symmetry about the axis of symmetry A1.

Such symmetry in planar perspective view can be achieved even if the multiple power supply ICs 15 and the multiple optical ICs 7 are distributed on the first surface 5*a* and the second surface 5*b* (illustrated example), or even if the multiple power supply ICs 15 and the multiple optical ICs 7 are mounted on the same surface (see FIG. 13, described below). The former case is illustrated in the illustrated example. More specifically, in the illustrated example, all the power supply ICs 15 are mounted on the second surface 5*b* and all the optical ICs 7 are mounted on first surface 5*a*.

With the above horizontally symmetrical configuration, for example, part of the wiring line 21 from the first power supply IC 15A to the first optical IC 7A (or the second optical IC 7B) and part of the wiring line 21 from the second power supply IC 15B to the second optical IC 7B (or the first optical IC 7A) are easily configured to be horizontally symmetrical with each other. As a result, for example, the resistance values of the wiring lines 21 for which both the source and destination of power are different from each other can be predicted in the same way, and thus the design burden is reduced.

When the two power supply ICs 15 are said to be disposed in a horizontally symmetrical manner, the two power supply ICs 15 may be at perfectly symmetrical positions (some allowable deviation may exist) in plan view, or there may be some misalignment therebetween. If a misalignment exists, whether or not they are disposed in a horizontally symmetrical manner may be determined in a reasonable manner. For example, if the distance between the centers of the two power supply ICs 15 in plan view is less than or equal to ½, ⅓, or ⅕ of the minimum width of each power supply IC 15 (or the smaller one if the two power supply ICs 15 differ from each other), the two power supply ICs 15 may be determined to be disposed in a horizontally symmetrical manner.

In the illustrated example, the wiring line 21 connected to the first power supply IC 15A and the wiring line 21 connected to the second power supply IC 15B extend through different conductor layers 525 (first conductor layer 525A and second conductor layer 525B). In this case, for example, the conductor layers 525 can be made to overlap each other, and this facilitates making the positions, shapes, and dimensions of portions of the two conductor layers 525 have line symmetrical about the axis of symmetry A1. In this case, the above portions may be, for example, greater than or equal to ½ or ⅔ of the area of each conductor layer 525 (or the smaller one if the areas of the two layers are different).

However, unlike in the illustrated example, the wiring line 21 connected to the first power supply IC 15A and the wiring line 21 connected to the second power supply IC 15B may extend through the same conductor layer 525. Even in this case, for example, when the y-direction positions of the power supply ICs 15 and the y-direction positions of the optical ICs 7 are the same as each other, portions of the two conductor layers 525 can be made to have line symmetry about an axis of symmetry, which is not illustrated, parallel to the x direction.

As described above, in addition to the first power supply IC 15A, the optical module 501 may include the second power supply IC 15B that supplies power to the first optical IC 7A and the second optical IC 7B. In planar perspective view, the first power supply IC 15A and the second power supply IC 15B may be positioned with line symmetry about the prescribed axis of symmetry A1. The first optical IC 7A and the second optical IC 7B may be positioned with line symmetry about the axis of symmetry A1.

In this case, as already mentioned, the multiple wiring lines 21 are easily configured so as to be horizontally symmetrical with each other. As a result, for example, the design burden is reduced.

A module substrate 5E may have the first surface 5*a* and the second surface 5*b* on the opposite side from the first surface 5*a*. The first optical IC 7A and the second optical IC 7B may be positioned on the first surface 5*a*. The first power supply IC 15A and the second power supply IC 15B may be positioned on the second surface 5*b*.

In this case, for example, since the power supply ICs 15 and the optical ICs 7 may overlap each other, the area of the module substrate 5D is easily reduced.

Sixth Embodiment

Figure 13A:
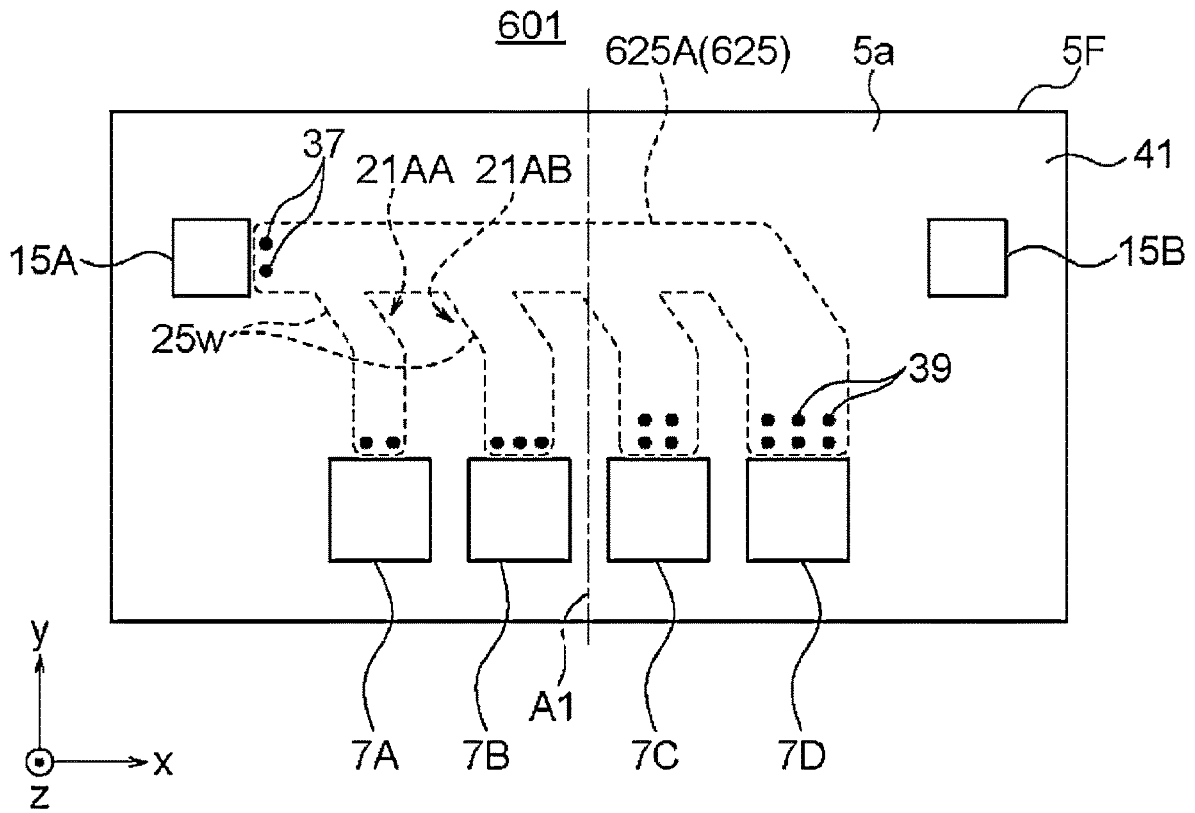
FIG. 13A is a planar perspective view illustrating the configuration of an optical module according to a Sixth Embodiment and the shape of a first conductor layer.
Figure 13B:
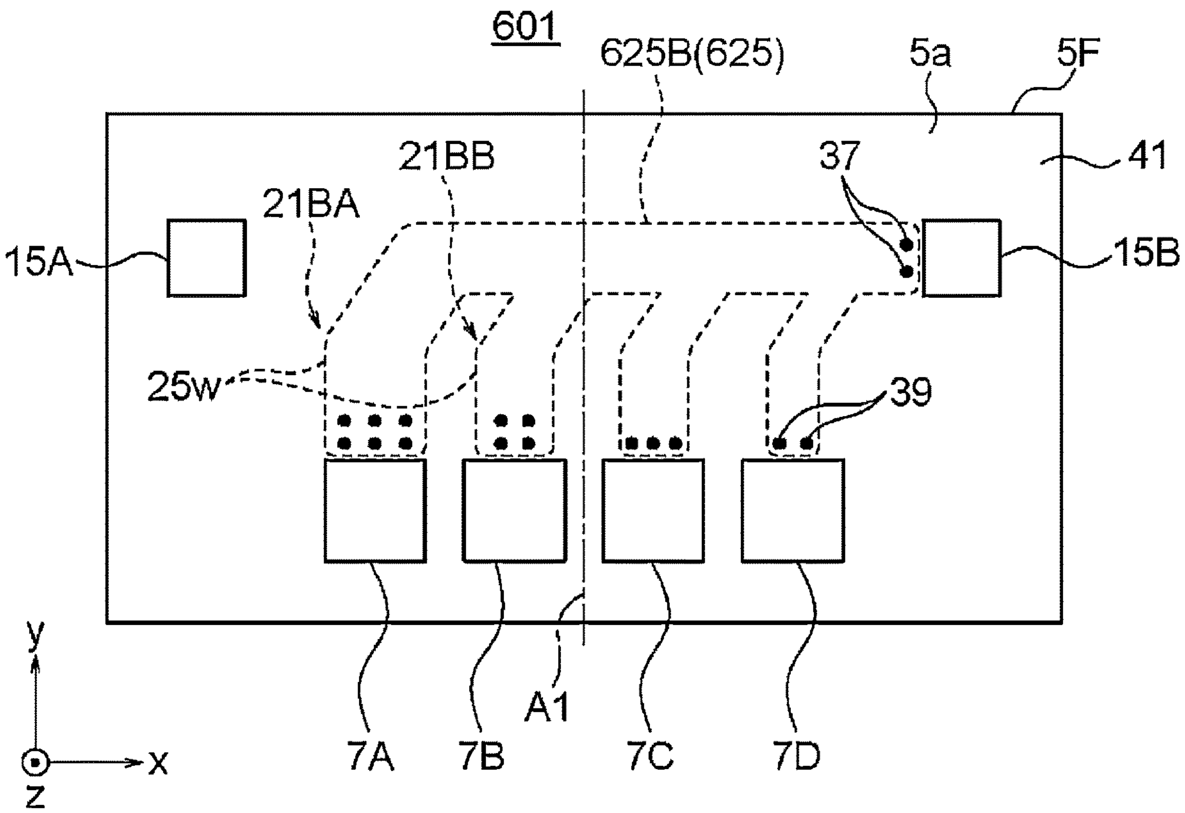
FIG. 13B is a planar perspective view illustrating the configuration of the optical module in FIG. 13A and the shape of a second conductor layer.

FIGS. 13A and 13B are planar perspective views illustrating the configuration of an optical module 601 according to the Sixth Embodiment. These figures corresponds to FIG. 4 of the First Embodiment. However, illustration of the pads 43 and 49 is omitted. Conductor layers 625 (first conductor layer 625A and second conductor layer 625B), which have different positions in the z-direction, are illustrated using dotted lines.

Furthermore, this figure, like FIG. 5, is a schematic drawing, and the arrangement of the wiring lines 21 and so forth do not necessarily correspond to the actual arrangement and so forth. For example, in FIGS. 13A and 13B, connection portions of the first conductor layer 625A to the optical ICs 7 (in other words, the regions where the via conductors 39 are disposed) and connection portions of the second conductor layer 625B to the optical ICs 7 overlap each other. In reality, the connection portions would be positioned in different regions from each other because the connection portions are both subjected to different powers (for example, different potentials from each other).

In the optical module 601, in short, among the multiple wiring lines 21 connecting one power supply IC 15 to the multiple optical ICs 7, the longer a particular wiring line 21 is, the larger the width of the wiring line 21 and the greater the number of via conductors 39. Such a configuration is also applied to both of two groups of wiring lines 21 for (at least) two power supply ICs 15. From another perspective, the relationship previously described using R1, R2, L1, and L2 holds true for at least four wiring lines for the two power supply ICs 15.

More precisely, in the illustrated example, an optical IC 7 having a relatively long wiring line 21, out of the multiple wiring lines 21, connected thereto for the first power supply IC 15A is connected to a relatively short line 21, out of the multiple wiring lines 21, for the second power supply IC 15B. Accordingly, an optical IC 7 provided with a wiring line 21 for the first power supply IC 15A that is relatively narrower and has relatively fewer via conductors 39 is provided with a wiring line 21 for the second power supply IC 15B that is relatively wider and has relatively more via conductors 39.

For example, a wiring line 21AA connecting the first power supply IC 15A to the first optical IC 7A is shorter than a wiring line 21AB connecting the first power supply IC 15A to the second optical IC 7B. Therefore, the former includes a narrower wiring line pattern 25*w* and fewer via conductors 39 than the latter. On the other hand, a wiring line 21BA connecting the second power supply IC 15B to the first optical IC 7A is longer than a wiring line 21BB connecting the second power supply IC 15B to the second optical IC 7B. Thus, the former includes a wider wiring line pattern 25*w* and a larger number of via conductors 39 than the latter.

In the illustrated example, the above relationship for the two power supply ICs 15, the two optical ICs 7, and the four wiring lines 21 connecting these ICs holds for any two power supply ICs 15 and any two optical ICs 7. In other words, the above relationship holds true for all the power supply ICs 15 and all the optical ICs 7. Of course, the above relationship does not need to hold true for all the power supply ICs 15 and all the optical ICs 7. In other words, the above relationship may hold true when focusing on some even number (two or more) of power supply ICs 15 out of a total number of odd or even power supply ICs 15, and some even number (two or more) of optical ICs 7 out of a total odd or even number of optical ICs 7.

In the illustrated example, (at least) two power supply ICs 15 are positioned on either side (−x or +x side) of a line of three or more (all in the illustrated example) optical ICs 7. As a result, for example, in each conductor layer 625, the lengths of all the wiring line patterns 25*w* tend to become longer (or shorter) in a sequential manner, the further the corresponding optical IC 7 is positioned toward one side in the x direction. However, as mentioned in the description of the First Embodiment, the positions of the power supply ICs 15 and the optical ICs 7 may be freely chosen, for example, the power supply ICs 15 may be located within the range of the line of multiple optical ICs 7. As is understood from this, the lengths of all the wiring line patterns 25*w* do not necessarily need to become longer (or shorter) in sequence.

In the illustrated example, at least two (and/or all) power supply ICs 15 and at least two (and/or all) optical ICs 7 are disposed with line symmetry about the axis of symmetry A1. Therefore, as described in the description of the Fifth Embodiment (FIG. 12), the first conductor layer 625A and second conductor layer 625B are more easily configured to have line symmetry with each other. Therefore, for example, the design burden is reduced. Of course, the arrangement of the multiple ICs does not need to have line symmetry.

In the illustrated example, two or more power supply ICs 15 and two or more optical ICs 7 are mounted on the same surface (first surface 5*a*). However, these multiple ICs may be distributed on the first surface 5*a* and the second surface 5*b*. For example, similarly to as in the Fifth Embodiment (FIG. 12), multiple optical ICs 7 (7A to 7D) may be mounted on the first surface 5*a* and multiple power supply ICs 15 (15A and 15B) may be mounted on the second surface 5*b*. The multiple optical ICs 7 (7A to 7D) may be mounted on the first surface 5*a*, the first power supply IC 15 may be mounted on the first surface 5*a*, and the second power supply IC 15 may be mounted on the second surface 5*b*. Even when the two power supply ICs 15 are mounted on different surfaces from each other in this manner, the effect due to symmetry resulting from the two power supply ICs 15 being disposed in a horizontally symmetrical manner in planar perspective view can be obtained.

As described above, in addition to the first power supply IC 15A, the optical module 601 may further include a second power supply IC that supplies power to the first optical IC 7A and the second optical IC 7B. A module substrate 5F may include first to fourth wiring lines (for example, wiring lines 21AA, 21AB, 21BA, and 21BB). The wiring line 21AA connects the first power supply IC 15A to the first optical IC 7A. The wiring line 21AB connects the first power supply IC 15A to the second optical IC 7B. The wiring line 21BA connects the second power supply IC 15B to the first optical IC 7A. The wiring line 21BB connects the second power supply IC 15B to the second optical IC 7B.

The lengths of the four wiring lines 21AA, 21AB, 21BA, and 21BB are denoted as L1, L2, L3, and L4. The resistance values of these four wiring lines 21 are denoted as R1, R2, R3, and R4. In this case, as already mentioned, $L2>L1$ and $|R2-R1|<(L2-L1)/L1\times R1$. Furthermore, $L3>L4$ and $|R3-R4|<(L3-L4)/L4\times R4$ may hold true.

In this case, for example, in a configuration where two power supply ICs 15 and two optical ICs 7 are disposed in a horizontally symmetrical manner, the drop amounts of the powers supplied by the two power supply ICs 15 can be brought closer together. Therefore, for example, the likelihood of malfunctions occurring in the optical ICs 7 is reduced. From another perspective, a horizontally symmetrical arrangement as described above can be realized without the occurrence of malfunctions. Although a horizontally symmetrical arrangement has been taken as an example for ease of understanding, the same can be said for asymmetrical arrangements that are close to horizontal symmetry.

The above four wiring lines 21AA, 21AB, 21BA, and 21BB may each include the wiring line pattern 25*w* and at least one via conductor 39. Each wiring line pattern 25*w* is positioned inside the module substrate 5F and is connected to the first power supply IC 15A or the second power supply IC 15B. Each via conductor 39 electrically connects any one of the wiring line patterns 25*w* to the first optical IC 7A or the second optical IC 7B. The width of the wiring line pattern 25*w* (second wiring line pattern) of the wiring line 21AB may be larger than the width of the wiring line pattern 25*w* (first wiring line pattern) of the wiring line 21AA. The number of via conductors 39 (second via conductor) in the wiring line 21AB may be greater than the number of via conductors 39 (first via conductor) in the wiring line 21AA. The width of the wiring line pattern 25*w* (third wiring line pattern) of the wiring line 21BA may be larger than the width of the wiring line pattern 25*w* (fourth wiring line pattern) of the wiring line 21BB. The number of via conductors 39 (third via conductor) in the wiring line 21BA may be greater than that in the wiring line 21BB (fourth via conductor).

In this case, for example, both the width of the wiring line patterns 25*w* and the number of via conductors 39 are adjusted, and as a result, the resistance values can be adjusted over a wide range. In addition, regarding the design conditions (length of the wiring lines 21, width of the wiring line patterns 25*w*, and the number of via conductors 39), the size relationship between the wiring line 21AA and the wiring line 21AB for the first power supply IC 15A and the size relationship between the wiring line 21BA and the wiring line 21BB for the second power supply IC 15B are opposite to each other, and therefore the conditions of the former two wiring lines 21 and the conditions of the latter two wiring lines 21 can be brought closer together (more symmetrical). As a result, for example, the design is simplified.

Technologies according to the present disclosure are not limited to the above embodiments and may be implemented in the form of various modes.

For example, not only fiber bundles but also wiring lines for transmitting electrical signals may extend out from the optical ICs. In this case, separate connectors may be provided for fiber bundles and wiring lines, or common connectors may be provided. In other words, in the latter case, the optical connectors may also serve as electrical connectors. An optical IC may correspond to one channel, as mentioned in the description of the embodiments. In other words, a single optical fiber may extend out instead of a fiber bundle. In addition, an optical IC may be an optical IC from which an optical fiber does not extend out.

REFERENCE SIGNS

1 optical module
5 module substrate
7 optical IC
7A first optical IC
7B second optical IC
15 power supply IC
15A first power supply IC
21 wiring line
21A first wiring line
21B second wiring line

The invention claimed is:

1. An optical module comprising:
a first optical IC and a second optical IC configured to perform photoelectric conversion;
a first power supply IC configured to supply power to the first optical IC and the second optical IC; and
a module substrate on which the first optical IC, the second optical IC, and the first power supply IC are positioned,
wherein the module substrate includes a first wiring line that connects the first power supply IC to the first optical IC, and
a second wiring line that connects the first power supply IC to the second optical IC,
when a resistance value of the first wiring line is R1, a resistance value of the second wiring line is R2, a length of a shortest path from the first power supply IC to the first optical IC within the first wiring line is L1, and a length of a shortest path from the first power supply IC to the second optical IC within the second wiring line is L2,
L2 is longer than L1, and
$|R2-R1|$ is smaller than $(L2-L1)/L1 \times R1$.

2. The optical module according to claim 1,
wherein the module substrate includes multiple conductor layers located at different positions in a thickness direction of the module substrate,
the first wiring line extends through at least one conductor layer, among the multiple conductor layers, while extending from the power supply IC to the first optical IC, and
while extending from the power supply IC to the second optical IC, the second wiring line extends in parallel through a greater number of conductor layers, among the multiple conductor layers, than a number of conductor layers through which the first wiring line extends.

3. The optical module according to claim 2,
wherein the multiple conductor layers include a first conductor layer through which both the first wiring line and the second wiring line extend, and
a second conductor layer through which only the second wiring line, out of the first wiring line and the second wiring line, extends.

4. The optical module according to claim 2,
wherein the multiple conductor layers include a first conductor layer having a first pattern constituting the second wiring line, and
a second conductor layer having a second pattern constituting the second wiring line,
at least part of the first pattern and at least part of the second pattern overlap each other in planar perspective view.

5. The optical module according to claim 1,
wherein the module substrate includes, thereinside, one or more conductor layers electrically connected to the first power supply IC,
the first wiring line includes at least one first via conductor electrically connecting at least one conductor layer, out of the one or more conductor layers, to the first optical IC,
the second wiring line includes at least one second via conductor electrically connecting at least one conductor layer, out of the one or more conductor layers, to the second optical IC, and
there is a greater number of the second via conductors than the first via conductors.

6. The optical module according to claim 1,
wherein the module substrate includes a first conductor layer and a second conductor layer located at different positions in a thickness direction of the module substrate,
the first wiring line extends through only the first conductor layer, out of the first conductor layer and the second conductor layer, while extending from the power supply IC to the first optical IC,
the second wiring line extends through only the second conductor layer, out of the first conductor layer and the second conductor layer, while extending from the power supply IC to the second optical IC, and
a width of a pattern constituting the second wiring line of the second conductor layer is larger than a width of a pattern constituting the first wiring line of the first conductor layer.

7. The optical module according to claim 1, further comprising:
a second power supply IC configured to supply power to the first optical IC and the second optical IC,
wherein the module substrate has a first surface and a second surface on an opposite side from the first surface,
the first power supply IC and the first optical IC are positioned on the first surface, and the second power supply IC and the second optical IC are positioned on the second surface.

8. The optical module according to claim 7, wherein in planar perspective view, the first power supply IC and the second power supply IC overlap each other, and the first optical IC and the second optical IC overlap each other.

9. The optical module according to claim 1, further comprising:

a second power supply IC configured to supply power to the first optical IC and the second optical IC, wherein in planar perspective view, the first power supply IC and the second power supply IC are positioned in a line symmetrical manner about a prescribed axis of symmetry, and the first optical IC and the second optical IC are positioned in a line symmetrical manner about the axis of symmetry.

10. The optical module according to claim 9, wherein the module substrate has a first surface and a second surface on an opposite side from the first surface, the first optical IC and the second optical IC are positioned on the first surface, and the first power supply IC and the second power supply IC are positioned on the second surface.

11. The optical module according to claim 1, further comprising:

a second power supply IC configured to supply power to the first optical IC and the second optical IC, wherein the module substrate includes a third wiring line that connects the second power supply IC to the first optical IC, and a fourth wiring line that connects the second power supply IC to the second optical IC, when a resistance value of the third wiring line is R3, a resistance value of the fourth wiring line is R4, a length of a shortest path from the second power supply IC to the first optical IC within the third wiring line is L3, and a length of a shortest path from the second power supply IC to the second optical IC within the fourth wiring line is L4, L3 is longer than L4, and $|R3-R4|$ is smaller than $(L3-L4)/L4\times R4$.

12. The optical module according to claim 11, wherein the first wiring line includes a layer-shaped first wiring line pattern positioned inside the module substrate and connected to the first power supply IC, and at least one first via conductor electrically connecting the first wiring line pattern to the first optical IC, the second wiring line includes a layer-shaped second wiring line pattern positioned inside the module substrate and connected to the first power supply IC, and at least one second via conductor electrically connecting the second wiring line pattern to the second optical IC, the third wiring line includes a layer-shaped third wiring line pattern positioned inside the module substrate and connected to the second power supply IC, and at least one third via conductor electrically connecting the third wiring line pattern to the first optical IC, the fourth wiring line includes a layer-shaped fourth wiring line pattern positioned inside the module substrate and connected to the second power supply IC, and at least one fourth via conductor electrically connecting the fourth wiring line pattern to the second optical IC, a width of the second wiring line pattern is larger than a width of the first wiring line pattern, there is a greater number of the at least one second via conductor than the at least one first via conductor, a width of the third wiring line pattern is larger than a width of the fourth wiring line pattern, and there is a greater number of the at least one third via conductor than the at least one fourth via conductor.

13. The optical module according to claim 1, further comprising:

a first fiber bundle including multiple optical fibers extending parallel to each other and extending out from the first optical IC;

a second fiber bundle including multiple optical fibers extending parallel to each other and extending out from the second optical IC;

a first optical connector positioned at an end of the first fiber bundle on an opposite side from the first optical IC and connected to an external optical element so as to be capable of transmitting an optical signal to the external optical element;

a second optical connector positioned at an end of the second fiber bundle on an opposite side from the second optical IC and connected to an external optical element so as to be capable of transmitting an optical signal to the external optical element; and at least one control IC positioned on the module substrate and configured to control at least one of the first optical IC and the second optical IC.

14. An optical communication device comprising:

the optical module according to claim 1, and a motherboard electrically connected to the optical module.

* * * * *